(12) United States Patent
Asano et al.

(10) Patent No.: US 8,153,070 B2
(45) Date of Patent: Apr. 10, 2012

(54) MICROREACTOR

(75) Inventors: Yukako Asano, Kashiwa (JP); Tetsuro Miyamoto, Kasumigaura (JP); Hajime Katou, Tsuchiura (JP); Shigenori Togashi, Abiko (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 12/431,011

(22) Filed: Apr. 28, 2009

(65) Prior Publication Data

US 2009/0269251 A1    Oct. 29, 2009

(30) Foreign Application Priority Data

Apr. 28, 2008   (JP) .................. 2008-117671

(51) Int. Cl.
*B01J 19/00*   (2006.01)
*B01J 8/00*    (2006.01)
*B01J 8/04*    (2006.01)
*B01J 10/00*   (2006.01)

(52) U.S. Cl. ........ 422/130; 422/129; 422/600; 422/603; 422/606; 422/607; 422/630; 422/644

(58) Field of Classification Search .................. 422/129, 422/130, 211, 600, 603, 606, 607, 630, 644
See application file for complete search history.

(56) References Cited

U.S. PATENT DOCUMENTS 6,225,497 B1 *  5/2001  Becker et al. ................. 560/347
6,851,846 B2 *  2/2005  Fujii et al. ................... 366/173.2

2003/0219903 A1  11/2003  Wang et al.
2008/0058574 A1  3/2008   Tonkovich
2008/0314761 A1  12/2008  Herminghaus

FOREIGN PATENT DOCUMENTS

| DE | 10 2005 037 401 A1 | 2/2007 |
|----|----|----|
| JP | 2003-047839 | 2/2003 |
| JP | 2003-047840 | 2/2003 |
| JP | 2003-088754 | 3/2003 |
| JP | 2006-508783 | 3/2006 |
| WO | WO 2007/112945 | 10/2007 |

OTHER PUBLICATIONS

Office of Japanese Appln. No. 2008-117671 dated Jun. 8, 2010.
EP Search Report of Appln. 09005848.8 dated Nov. 30, 2010 in English.

* cited by examiner

*Primary Examiner* — Walter D Griffin
*Assistant Examiner* — Natasha Young
(74) *Attorney, Agent, or Firm* — Antonelli, Terry, Stout & Kraus, LLP.

(57) ABSTRACT

A microreactor capable of reducing a pressure drop in an entire system includes a mixer 103 having a mixing channel for mixing two kinds of raw materials 101 and 102, and a reactor 109 having a reaction channel connected to the downstream side of the mixing channel to receive the mixture flowing out from the mixing channel and cause chemical reactions of the mixture inside the reaction channel. The reactor 109 a first reactor unit 107 having a large surface-to-volume (S-V) ratio of the reaction channel at an upstream side, and a second reactor unit 108 having a small S-V ratio of the reaction channel at a downstream.

10 Claims, 17 Drawing Sheets

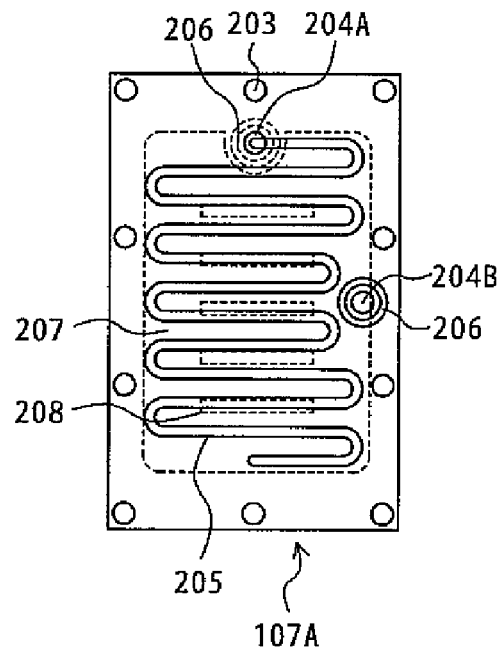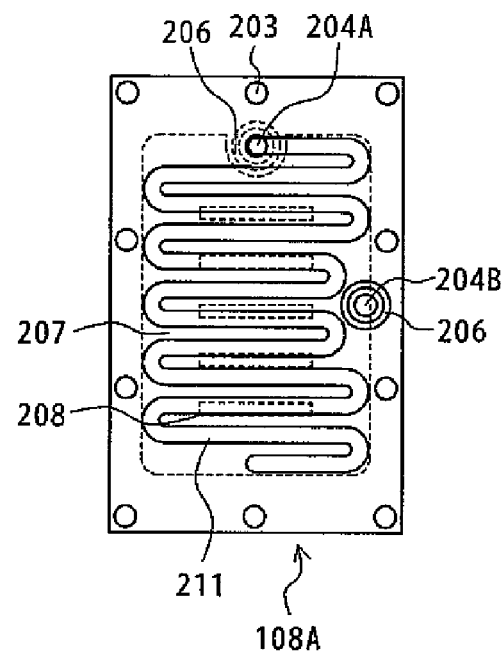

PRESSURE DROP P AND VOLUME V ARE CONSTANT $$(V = V_1 + V_2)$$

PRESSURE DROP P AND VOLUME V ARE CONSTANT $$(V = V_1 + V_2)$$

($V_1/V = 0.37$, $k_A/k_{Q1} = 0.33$, $k_{Q1}/k_{Q2} = 1.31$)

($k_A/k_{Q1} = 0.33$, $k_{Q1}/k_{Q2} = 1.31$)

($d_1/d_2 = 0.68$, $V_1/V = 0.32$, $k_A/k_{Q1} = 0.33$, $k_{Q1}/k_{Q2} = 1.46$)

($k_A/k_{Q1} = 0.33$, $k_{Q1}/k_{Q2} = 1.46$)

$(\int Q(k_{Q1} \rightarrow k_{Q2})dt / \int Q(k_{Q2})dt = 1)$ $(\int Q(k_{Q1} \rightarrow k_{Q2})dt / \int Q(k_{Q2})dt = 1)$

MICROREACTOR

BACKGROUND OF THE INVENTION

1. Field of the Invention

The present invention relates generally to microreactors, and more particularly, to a microreactor that includes a mixing channel for mixing at least two kinds of raw materials, and a reaction channel connected to a downstream side of the mixing channel to receive the mixture flowing out therefrom and cause chemical reactions of the mixture inside the reaction channel.

2. Description of the Related Art

In recent years, there has been a blossoming of approaches to applying a microreactor, a device fabricated using micro-processing technology or the like to mix fluids in a microchannel, to biological and medical fields or to the field of chemical reactions.

Synthesis reactions in microreactors are known to have the feature that as the size of the reaction field decreases, the relative advantageous effects of a surface area with respect to the volume of the fluid will increase to provide extremely high heat-exchange efficiency. It is expected, therefore, that even a reaction liable to become uncontrollable because of heat in the batch method, a reaction that requires precise temperature control, and a reaction that requires rapid heating or cooling will be easily executable by using a microreactor. However, since a reaction rate, the heat of reaction, the number of side reactions, and the like will vary from reaction to reaction, the need will arise to optimize the performance of the microreactor according to the kind of reaction implemented.

Various development activities and studies on temperature controllability of microreactors have heretofore been performed. Firstly, JP-A-2003-47839, for example, discloses a microreactor adapted to selectively supply an electric current to a plurality of microheaters each having a specific length equal to an integral multiple of unit length and arrayed so that the respective lengths increase in order.

Secondly, JP-A-2003-47840, for example, proposes a microreactor having a plurality of microheaters along a plurality of microchannels provided in parallel to one another, and adapted so that the positions of the microheaters that are common to one another are each controlled as one control unit.

Thirdly, JP-A-2003-88754, for example, describes a microheater that includes a plurality of heat transfer procedures for supplying required heat energy, and heat transfer control procedures for controlling the temperatures of the plurality of heat transfer procedures.

SUMMARY OF THE INVENTION

However, a very large variety of reactions exist. As a matter of fact, therefore, it is unrealistic to optimize the temperature controllability of a microreactor for each kind of reaction. That is to say, it is considered to become important how a microreactor having the appropriate temperature controllability according to the heat of reaction arising from reactions can be easily constructed.

In microreactors, particularly since raw materials are mixed rapidly, various reactions occur in rapid sequence near the merging section of the raw materials. If the reactions are exothermic reactions, the heat of reaction arising from each reaction will cause locally heating mainly at the merging section of the raw materials, with the heat value decreasing later as it goes downstream. If the microreactor has sufficient heat controllability, temperature changes associated with the reactions can be suppressed. During actual operation, however, heat controllability is usually not sufficient. To appropriately control the heat arising from the reaction and maintain the desired reaction temperature, therefore, it becomes necessary to take the appropriate temperature control measures according to the heat of reaction occurring due to the reaction.

Methods usable to conduct more efficient temperature control in a microreactor include (a) using a more highly heat-conductive material for the microreactor, (b) increasing the surface area between the fluid and the channel, and so on. Using a more highly heat-conductive material, principally a metallic material, is desirable for method (a), but highly heat-conductive materials tend to be low in corrosion resistance, and highly corrosion-resistant materials tend to be low in workability.

For method (b), although reducing characteristic length improves heat controllability, the resulting increase in pressure drop reduces amount of production or makes it more difficult to supply high-viscosity fluids. Conversely, increasing the characteristic length reduces pressure drop, but deteriorates heat controllability. That is to say, temperature controllability is a trade-off between the pressure drop and heat controllability of the entire system. It is desired, therefore, that: at the upstream side, importance be attached to heat controllability even at the sacrifice of improvement in pressure drop, whereas at the downstream side, although heat controllability is merely of a moderate level, the pressure drop be reduced for minimum pressure drop in the entire system.

A first object of the present invention is to provide a microreactor capable of reducing a pressure drop in an entire system.

A second object of the present invention is to provide a microreactor of a simplified configuration in addition to being capable of reducing a pressure drop in an entire system.

A third object of the present invention is to provide a microreactor capable of reducing a pressure drop in an entire system, simplified in configuration, and having temperature controllability.

(1) In order to fulfill the above first object, a microreactor according to the present invention includes a mixing channel for mixing at least two kinds of raw materials, and a reaction channel connected to a downstream side of the mixing channel to receive the mixture flowing out therefrom and cause chemical reactions of the mixture inside the reaction channel, the microreactor being constructed such that a surface-to-volume (S-V) ratio of the reaction channel changes at least one time during the flow of the mixture through the reaction channel and such that the S-V ratio of the reaction channel becomes larger at an upstream side thereof than at a downstream side thereof.

In the above configuration, a pressure drop in an entire system can be reduced.

(2) In above item (1), an internal volume ratio of the reaction channel at the upstream side thereof to that of the reaction channel at the downstream side thereof preferably ranges from 1:0.65 to 1:4, in which case, a position at which the S-V ratio changes is used as a reference position.

(3) In order to fulfill the above second object, another microreactor according to the present invention includes a mixing channel for mixing at least two kinds of raw materials, and a reaction channel connected to a downstream side of the mixing channel to receive the mixture flowing out therefrom and cause chemical reactions of the mixture inside the reaction channel; the reaction channel being constructed by providing two kinds of flat-shaped plates different from each other in the surface-to-volume (S-V) ratios of the channels, and stacking the two kinds of plates upon each other in the same number of layers, such that when a position at which the S-V ratio changes is taken as a reference position, the S-V ratio of the channel becomes larger at an upstream side thereof than at a downstream side thereof.

In the above configuration, a pressure drop in an entire system can be reduced. In addition, the configuration itself can be simplified.

(4) In above item (3), faces on which the reaction channel of the flat-shaped plates is formed preferably contact face to face, thus constructing the channel.

(5) In above item (3), a channel for heat control is formed on the backside of the face having the reaction channel thereupon.

(6) In order to fulfill the above third object, yet another microreactor according to the present invention includes a mixing channel for mixing at least two kinds of raw materials, and a reaction channel connected to a downstream side of the mixing channel to receive the mixture flowing out therefrom and cause chemical reactions of the mixture inside the reaction channel; the reaction channel and a heat carrier channel for heat control being constructed by providing, in addition to a flat-shaped plate with a heat control channel thereon, two kinds of flat-shaped plates different from each other in the surface-to-volume (S-V) ratios of the channels, and stacking the two kinds of plates upon each other in the same number of layers with the heat control plate stacked upon at least one of the two kinds of plates, such that when a position at which the S-V ratio changes is taken as a reference position, the S-V ratio of the channel becomes larger at an upstream side thereof than at a downstream side thereof.

In the above configuration, a pressure drop in an entire system can be reduced and the configuration itself can be simplified. In addition, the microreactor can have temperature controllability.

(7) In order to fulfill the above first object, a further microreactor according to the present invention includes a first mixing channel for mixing at least two kinds of raw materials, a first reaction channel connected to a downstream side of the first mixing channel to receive the mixture flowing out therefrom and cause chemical reactions of the mixture inside the first reaction channel, a second mixing channel for mixing other raw materials into a product flowing out from the first reaction channel, and a second reaction channel connected to a downstream side of the second mixing channel to receive the mixture flowing out therefrom and cause chemical reactions of this mixture inside the second reaction channel, the microreactor being constructed such that the surface-to-volume (S-V) ratios of both the first and second reaction channels change at least one time during the flow of the mixtures through the first and second reaction channels and such that the S-V ratios of the reaction channels become larger at an upstream side thereof than at a downstream side thereof.

In the above configuration, a pressure drop in an entire system can be reduced.

Therefore, according to the present invention, a pressure drop in the entire system can be reduced.

In addition, according to the present invention, a pressure drop in the entire system can be reduced and the microreactor configuration itself can be simplified.

Furthermore, according to the present invention, a pressure drop in the entire system can be reduced, the microreactor configuration itself can be simplified, and the microreactor can have temperature controllability.

BRIEF DESCRIPTION OF THE DRAWINGS

FIGS. 5A and 5B are plan views that show configurations of a first reactor unit and second reactor unit, respectively, of a reactor used in the microreactor according to the first embodiment of the present invention;

DESCRIPTION OF THE PREFERRED EMBODIMENTS

A configuration of a microreactor according to a first embodiment of the present invention is described below using FIGS. 1 to 11.

Figure 1:
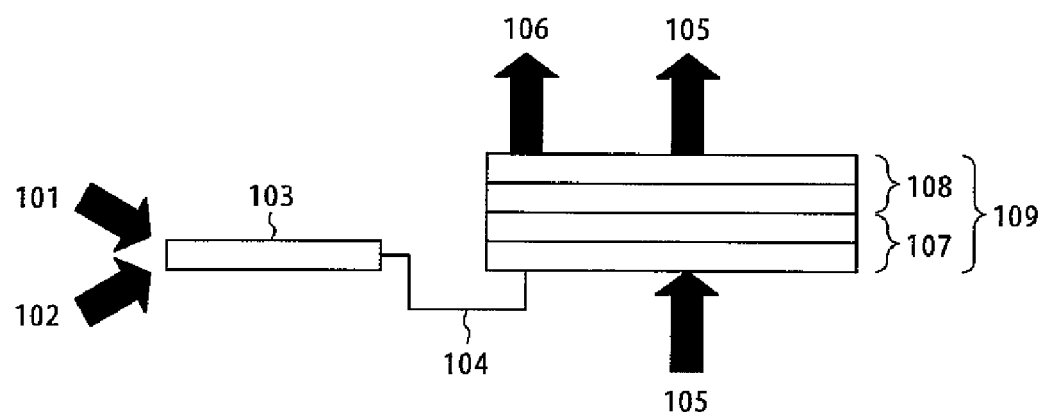
FIG. 1 is a front view showing the configuration of the entire microreactor according to the first embodiment of the present invention.

First, the configuration of the entire microreactor according to the first embodiment of the present invention is described using FIG. 1.

FIG. 1 is a front view showing the configuration of the entire microreactor according to the first embodiment of the present invention.

The microreactor of the present embodiment includes a mixer 103 having a mixing channel, a connector tube 104, and a reactor 109 having a reaction channel.

A first raw material 101 and a second raw material 102 are introduced into the mixer 103, and then the two kinds of materials are mixed in the mixing channel located inside the mixer 103. The materials that have been mixed in the mixer 103 are further introduced into the reactor 109 via the connector tube 104. Inside the reactor 109, the two kinds of mixed materials chemically react upon each other to form a product 106. Also, a heat carrier 105 for controlling temperature is introduced into the reactor 109 so that the chemical reactions in the reactor 109 take place at a desired temperature. A heat carrier channel for the heat carrier 105 to flow through is formed in the reactor 109. A structure of the mixing channel in the mixer 103 will be described later herein using FIG. 2. Structures of the reaction channel and heat carrier channel in the reactor 109 will be described later herein using FIGS. 3A and 3B.

The reactor 109 in the present embodiment is characterized in that the reactor 109 includes a first reactor unit 107 having a large surface-to-volume (S-V) ratio at an upstream side of the channel, and a second reactor unit 108 having a small S-V ratio at a downstream side of the channel. The S-V ratios will be detailed later herein using FIGS. 3A, 3B onward.

In the present embodiment, the first raw material 101, the second raw material 102, and the heat carrier 105 are introduced using some type of liquid supply element, which can be, for example, a syringe pump, a manual syringe, a plunger pump, a diaphram pump, or a screw pump. A liquid supply element using a water head difference can be used as an alternative.

The kind of heat carrier 105 can be changed as appropriate according to a desired reaction temperature to be set. For example, water, a water-ethanol mixture, ethylene glycol, or any other liquid can be used at the desired reaction temperature. In addition, if the desired reaction temperature is room temperature, the heat carrier 105 is not always required, depending upon heat of reaction and upon heat controllability of the microreactor.

Furthermore, while an example of mixing two kinds of raw materials in the mixer 103 is shown and described in the present embodiment, three or more kinds of raw materials may be mixed. Moreover, the plural kinds of materials may be mixed uniformly or may be mixed heterogeneously (i.e., may be emulsified).

Unless the reaction is badly affected, the kind of material of the connector tube 104 can be changed appropriately according to a temperature or physical characteristics of a solution flowing through the tube. For example, the connector tube material can be stainless steel, silicon, glass, a hastelloy, silicon resin, fluorinated resin, or the like. Alternatively, a material with improved corrosion resistance, such as a glass lining, stainless steel, silicon, or any other material surface-coated with nickel, gold, or the like, or surface-oxidized silicon can be used as the tube material.

Moreover, unless the reaction is badly affected, the kind of material of the reactor 109 can be changed appropriately according to the kind of reaction. For example, the reactor material can be stainless steel, silicon, gold, glass, hastelloy, silicon resin, fluorinated resin, or the like. Alternatively, a material with improved corrosion resistance, such as a glass lining, a metallic material surface-coated with nickel, gold, or the like, or surface-oxidized silicon can be used as the reactor material.

Next, a configuration of the mixer 103 used in the microreactor according to the present embodiment will be described using FIG. 2.

Figure 2:
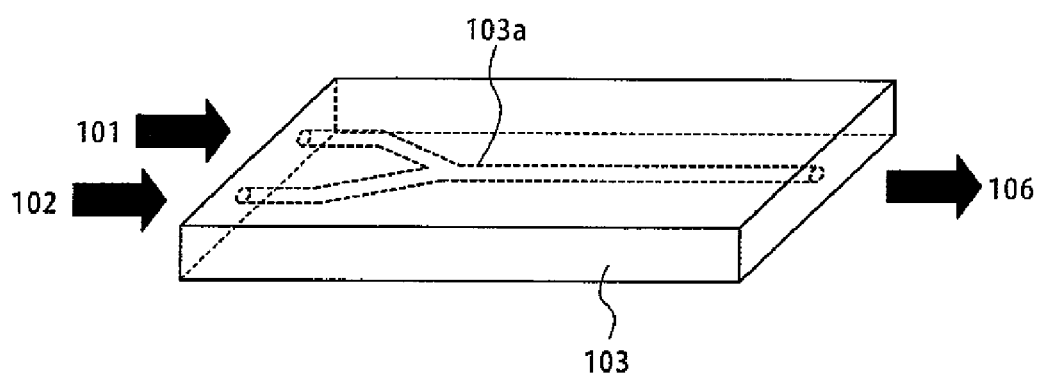
FIG. 2 is a perspective view showing the configuration of the mixer used in the microreactor according to the first embodiment of the present invention.

FIG. 2 is a perspective view showing the configuration of the mixer used in the microreactor according to the first embodiment of the present invention.

The mixer 103 internally has a Y-shaped mixing channel 103a formed with two inflow ports and one outflow port, as denoted by a dotted line. The first raw material 101 is introduced from a first inflow port into the mixing channel 103a, and the second raw material 102 is introduced from a second inflow port into the mixing channel 103a. The two kinds of raw materials that have flown in from the first inflow port and the second inflow port converge midway in the mixing channel 103a and are mixed therein.

Next, a configuration of the reactor 109 used in the microreactor according to the present embodiment will be described using FIGS. 3A to 6.

Figure 3A:
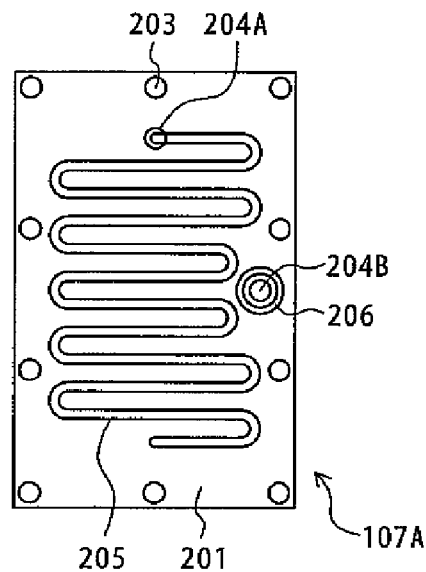
FIGS. 3A and 3B are a plan view and bottom view showing a plate configuration used in a first reactor unit of the microreactor according to the first embodiment of the present invention.
Figure 3B:
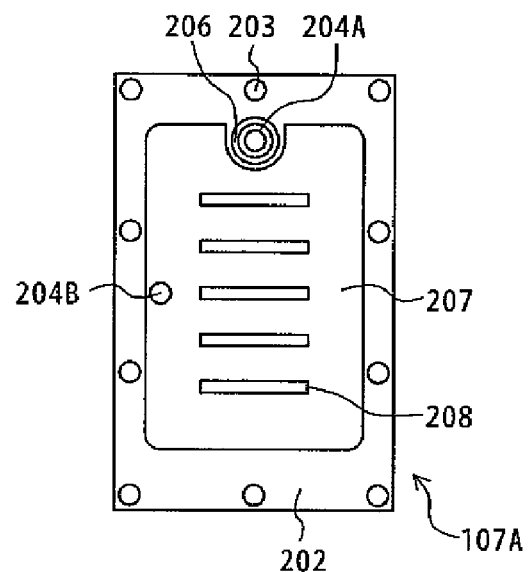
Figure 4A:
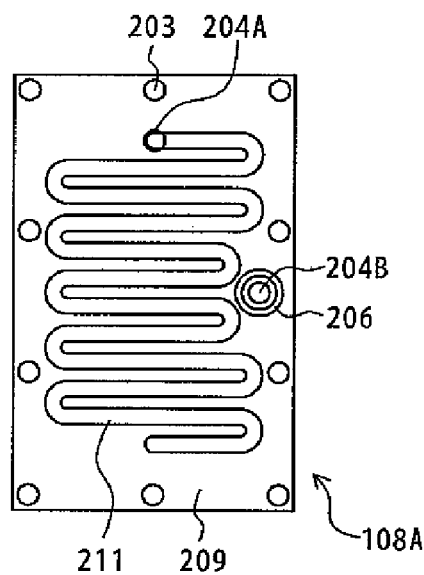
FIGS. 4A and 4B are a plan view and bottom view showing another plate configuration used in a second reactor unit of the microreactor according to the first embodiment of the present invention.
Figure 4B:
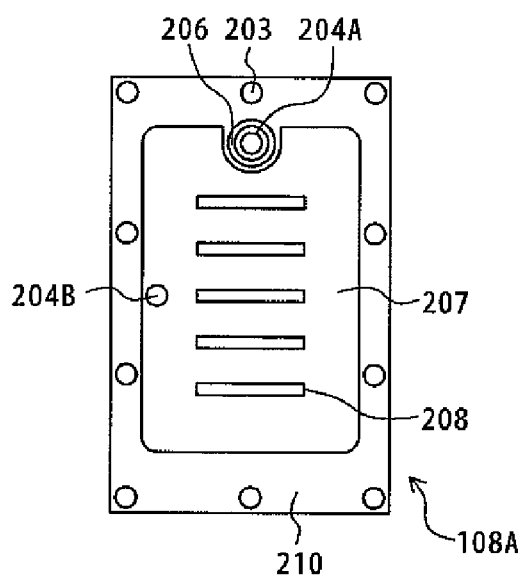
Figure 6A:
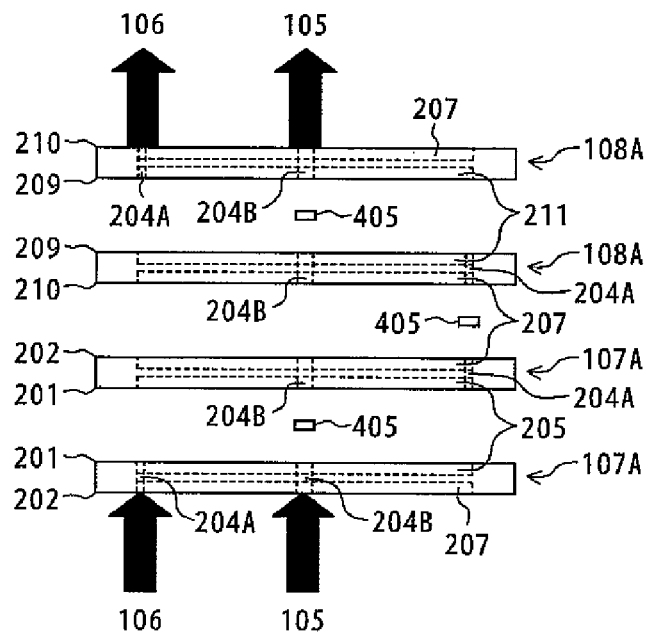
FIG. 6A is an exploded front view of the reactor used in the microreactor according to the first embodiment of the present invention.
Figure 6B:
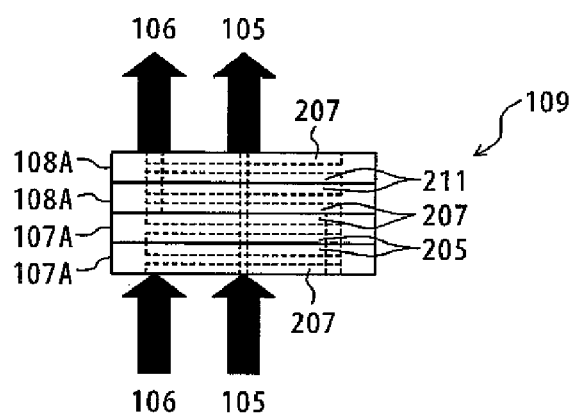
FIG. 6B is a front view of the reactor.

FIGS. 3A and 3B are a plan view and bottom view showing a configuration of a plate used in the first reactor unit of the microreactor according to the first embodiment of the present invention. FIGS. 4A and 4B are a plan view and bottom view showing a configuration of a plate used in the second reactor unit of the microreactor according to the first embodiment of the present invention. FIGS. 5A and 5B are plan views that show configurations of the first reactor unit and second reactor unit, respectively, of the reactor used in the microreactor according to the first embodiment of the present invention. FIG. 6A is an exploded front view of the reactor used in the microreactor according to the first embodiment of the present invention. FIG. 6B is a front view of the reactor.

As described above, the reactor 109 in the present embodiment includes the first reactor unit 107 having a large surface-to-volume (S-V) ratio at the upstream side of the reaction channel, and the second reactor unit 108 having a small S-V ratio at the downstream side of the channel. The first reactor unit 107 is formed by stacking in two layers the first plate 107A shown in FIGS. 3A, 3B. A reaction channel is formed on one face of the first plate 107A, and a heat carrier channel on another face. Also, the second reactor unit 108 is formed by stacking in two layers the second plate 108A shown in FIGS. 4A, 4B. A reaction channel is formed on one face of the second plate 108A, and a heat carrier channel on another face. A surface-to-volume (S-V) ratio of the first plate 107A on the reaction channel thereof, disposed at the upstream side, is set to be higher than an S-V ratio of the second plate 108A on the reaction channel thereof, disposed at the downstream side.

First, a configuration of the plate 107A used in the first reactor unit 107 of the microreactor according to the present embodiment is described below using FIGS. 3A, 3B. FIG. 3A is a front view of the plate 107A, showing the surface 201 thereof. FIG. 3B is a bottom view of the plate 107A, showing the reverse 202 thereof. The plate 107A is formed so that the reaction channel has a large surface-to-volume (S-V) ratio.

As shown in FIG. 3A, threaded holes 203 each for screwing down the first plate 107A in stacked form to the other first plate, a groove 206 for an O-ring used for preventing leakage from the plate, a channel 205 of a large S-V ratio, and the through-hole 204A for causing a fluid within the channel 205 of the first plate 107A to flow through to next plate are formed on the surface 201 of the first plate 107A.

Also, as shown in FIG. 3B, threaded holes 203 each for screwing down the first plate 107A in stacked form to the other first plate, a groove 206 for an O-ring used for preventing leakage from the plate, a channel 207 for a heat carrier, the through-hole 204B for causing a fluid within the channel 207 of the first plate 107A to flow through to the next plate, and guides 208 each for ensuring the flow of the heat carrier are formed on the reverse 202 of the first plate 107A.

Next, a configuration of the plate 108A used in the second reactor unit 108 of the microreactor according to the present embodiment is described below using FIGS. 4A, 4B. FIG. 4A is a front view of the plate 108A, showing the surface 209 thereof. FIG. 4B is a bottom view of the plate 108A, showing the reverse 210 thereof. The plate 108A is formed so that the reaction channel has a small surface-to-volume (S-V) ratio, compared with the S-V ratio of the reaction channel on the first plate 107A.

As shown in FIG. 4A, threaded holes 203 each for screwing down the second plate 108A in stacked form to the other second plate, a groove 206 for an O-ring used for preventing leakage from the plate, a channel 211 of a small S-V ratio, and the through-hole 204A for causing a fluid within the channel 211 of the second plate 108A to flow through to next plate are formed on the surface 209 of the second plate 108A.

Also, as shown in FIG. 4B, threaded holes 203 each for screwing down the second plate 108A in stacked form to the other second plate, a groove 206 for an O-ring used for preventing leakage from the plate, a channel 207 for the heat carrier, the through-hole 204B for causing a fluid within the channel 207 of the second plate 108A to flow through to the next plate, and guides 208 each for ensuring the flow of the heat carrier are formed on the reverse 210 of the second plate 108A.

In the surface 201 or reverse 202 of the first plate 107A or the surface 209 or reverse 210 of the second plate 108A, the A channel structure thereon obtained by rotating the plate through 180 degrees from a face is an enantiomer of the original channel structure thereon. Also, the reverse 202 of the first plate 107A and the reverse 210 of the second plate 108A are of the same channel structure. In this case, a channel structure obtained by rotating one plate through 180 degrees constitutes the channel structure of the particular plate, and at the same time, constitutes an enantiomer of the channel structure of the other plate.

The first plate 107A has a large S-V ratio of the channel, and the first plate 107A viewed from the surface side is shown in FIG. 5A. The second plate 108A, compared with the first plate 107A, has a small S-V ratio of the channel, and the second plate 108A viewed from the surface side is shown in FIG. 5B. For both the first plate 107A and the second plate 108A, although the channel structure differs between the surface and the reverse, the respective through-holes 204A and 204B overlap each other.

FIG. 6A shows an assembly state of the reactor 109. Two kinds of flat plates, that is, the first plate 107A and second plate 108A, are each stacked in two layers to construct the microreactor.

As described above, in the surface 201 of one of the two first plates 107A or the surface 209 of one of the two second plates 108A, the channel structure thereon obtained by rotating the plate through 180 degrees from the surface is an enantiomer of the original channel structure thereon. Therefore, the formation of the reaction channel in addition to complete matching in shape between the channels on each face can be achieved by matching the surfaces of the two plates of the same kind (i.e., the surfaces of the first plates 107A or the second plates 108A) in such a form as to make the through-holes 204A and 204B communicate with each other.

As described above, the reverse 202 of the first plate 107A and the reverse 210 of the second plate 108A are of the same channel structure, and the channel structure obtained by rotating one plate through 180 degrees constitutes the channel structure of the particular plate and at the same time constitutes an enantiomer of the channel structure of the other plate. Therefore, the formation of the heat carrier channel in addition to complete matching in shape between the channels on each face can be achieved by matching the reverses of the two plates of the same kind (i.e., the reverses of the first plates 107A or the second plates 108A) or the reverse of one of the first and second plates and the reverse of another plate in such a form as to make the through-holes 204A and 204B communicate with each other.

As shown in FIG. 6A, the reverse 202 of one first plate 107A, the surface 201 thereof, the surface 201 of the other first plate 107A, the reverse 202 thereof, the reverse 210 of one second plate 108A, the surface 209 thereof, the surface 209 of the other second plate 108A, and the reverse 210 thereof can be stacked in that order from the upstream side towards the downstream side, by establishing the communication between the through-holes 204A and 204B in the above-described way. The mixture 106 and heat carrier 105 introduced from the upstream side, therefore, can make the first plates 107A and the second plates 108A communicate through the through-holes 204A and 204B. An O-ring 405 is provided in necessary places to prevent liquid leakage from the channels.

Under the assembled state of the reactor 109, as shown in FIG. 6B, the mixture 106 and heat carrier 105 introduced from the upstream side can make the first plates 107A and the second plates 108A communicate through the through-holes 204A and 204B.

The channel structures on the reverse 202 of each first plate 107A and the reverse 210 of each second plate 108A need only to satisfy such a positional relationship that even the through-holes 204A and 204B match each other to ensure the flow of the heat carrier. Not all of the channel structures always need to be such that the channel structure obtained by rotating one plate through 180 degrees is the channel structure of the particular plate or an enantiomer of the channel structure of the other plate. In addition, the threaded holes 203 or screws for screwing down the plates are not shown in FIGS. 6A and 6B.

Referring to the reverse 202 of the first plate 107A positioned at the lowest stage under the state shown in FIG. 6A, a section corresponding to the heat carrier channel is not used as the heat carrier channel. The same also applies to the reverse 210 of the second plate 108A positioned at the highest stage.

Characteristic length of the channel 205 with a large S-V ratio, and that of the channel 211 with a small S-V ratio are set according to particular needs or the kind of reaction. These dimensions are usually changed as appropriate in a range below 1 cm, and more preferably, below a diameter of 1 mm of an eddy mass obtained by stirring in an experiment based on the batch method. Characteristic length of the channel 207 for the heat carrier may also be set according to the particular needs. For improved heat controllability and for minimum pressure drop in the entire reaction system, however, this characteristic length can usually be changed according to the liquid supply element used.

For a rectangular (trapezoidal) channel cross-sectional shape, the characteristic length of the channel refers to length of a diagonal line of the rectangle, trapezoid, or the like. Also, for a circular channel cross-sectional shape, the characteristic length of the channel is a diameter of the circle. For an ellipse, an average value of its major and minor diameters is the characteristic length of the channel.

Next, a method of setting the surface-to-volume (S-V) ratios of the channels in the reactor used in the microreactor according to the present embodiment is described below using FIGS. 7 to 11A and 11B.

Figure 7:
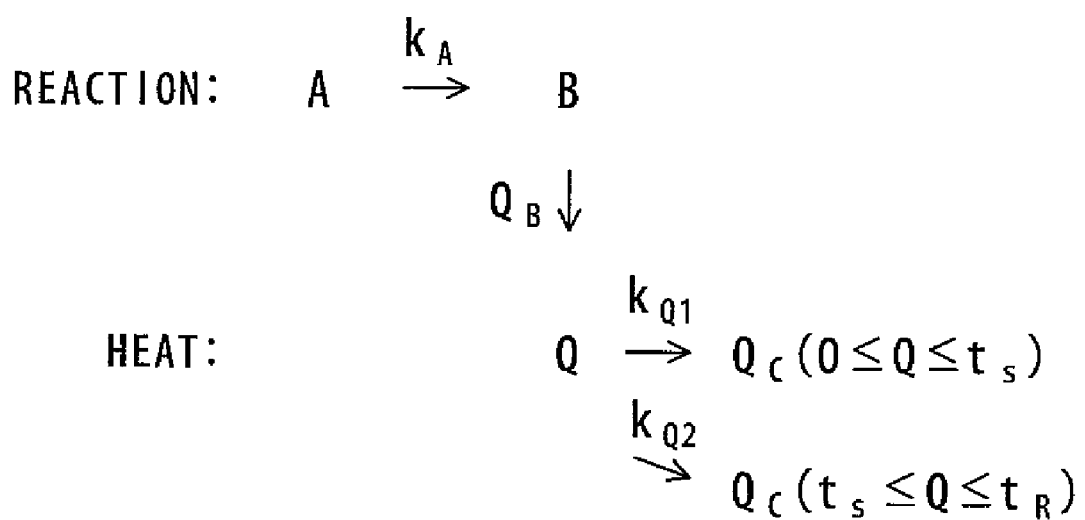
FIG. 7 is an explanatory diagram of a heat reaction model used for analysis in the reactor of the microreactor according to the first embodiment of the present invention.
Figure 8A:
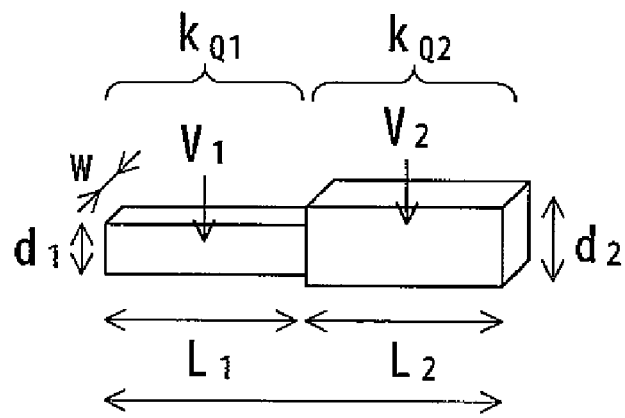
FIGS. 8A and 8B are explanatory diagrams of reactor models in which is changed a surface-to-volume (S-V) ratio of a channel used for analysis in the reactor of the microreactor according to the first embodiment of the present invention.
Figure 8B:
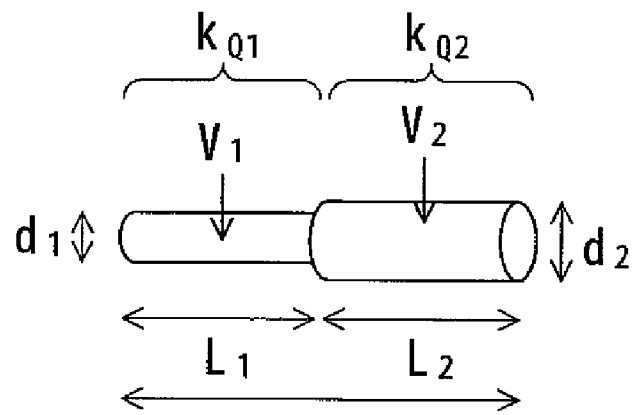

FIG. 7 is an explanatory diagram of a thermal reaction model used for analysis in the reactor of the microreactor according to the first embodiment of the present invention. FIGS. 8A and 8B are explanatory diagrams of reactor models in which is changed the S-V ratio of a channel used for analysis in the reactor of the microreactor according to the first embodiment of the present invention. FIGS. 9A and 9B and 10A and 10B are explanatory diagrams of analytical results in the reactor of the microreactor according to the first embodiment of the present invention. FIGS. 11A and 11B are explanatory diagrams of analytical results on volume ratio dependence of $k_A/k_{Q1}$ in the reactor of the microreactor according to the first embodiment of the present invention.

As described above, the reactor 109 in the present embodiment includes the first reactor unit 107 having a large reaction S-V ratio of the channel at the upstream side, and the second reactor unit 108 having a small S-V ratio of the channel at the downstream side. The values of these S-V ratios of the channels can be determined in the way described below. The description here allows for analytical studies relating to changes in the amount of heat with time due to changes in the values of the S-V ratios of the channels. Reactions from raw material A are strictly represented as combinations of elementary reactions. Experimentally, however, it is considered that these reactions can be loosely represented in the form of first-order reactions. A temperature-time curve (heat-time curve) derived from the reaction in the channel, therefore, is considered to be capable of being roughly approximated as a combination of first-order reactions.

FIG. 7 shows the thermal reaction model used for analysis. In this reaction model, product B is produced from reactant A, and the heat of reaction that occurs with the reaction is denoted as Q. A reaction rate constant of this reaction is expressed as $k_A$, and a heat-of-reaction constant of the heat of reaction, as $U_B$. Also, the heat of reaction Q that has occurred is removed as $Q_C$ by means of a heat removal rate constant $k_{Q1}$ if a reaction time "t" lies in a range of $0 \leq t \leq t_s$, or by means of a heat removal rate constant $k_{Q2}$ if the reaction time "t" lies in a range of $t_s \leq t \leq t_R$. In these relational expressions, "$t_s$" is a reaction time assuming that the channel is changed in width, and "$t_R$" is a time when the reaction comes to an end. In addition, $k_{Q1} > k_{Q2}$.

Reaction rate equations based upon the model of FIG. 7 can be written as follows:

$$-\frac{d[A]}{dt} = \frac{d[B]}{dt} = k_A[A] \quad \text{[Numerical expression 1]}$$

$$\frac{dQ}{dt} = k_A U_B[A] - k_{Q1}Q (0 \leq t \leq t_s) \quad \text{[Numerical expression 2]}$$

$$\frac{dQ}{dt} = k_A U_B[A] - k_{Q2}Q (t_s \leq t \leq t_R) \quad \text{[Numerical expression 3]}$$

$$\frac{dQ_C}{dt} = k_{Q1}Q_1 (0 \leq t \leq t_s) \quad \text{[Numerical expression 4]}$$

$$\frac{dQ_C}{dt} = k_{Q2}Q_2 (t_s \leq t \leq t_R) \quad \text{[Numerical expression 5]}$$

where Q is the amount of heat, $Q_C$ the amount of heat removal, [M] a concentration of the material M, "t" the reaction time, "$t_s$" the time when the channel width is changed, "$t_R$" the time when the reaction comes to an end, $k_A$ the reaction rate constant, $U_B$ the heat-of-reaction constant, $k_{Q1}$ the heat removal rate constant ($0 \leq t \leq t_s$), $k_{Q2}$ the heat removal rate constant ($t_s \leq t \leq t_R$), and $k_{Q1} > k_{Q2}$.

Conditions relating to a start of the reaction (t=0) are given by equations (6) and (7).

$$Q = Q_C = 0 \quad \text{[Numerical expression 6]}$$

$$[A] = [A]_0 \neq 0 \quad \text{[Numerical expression 7]}$$

A condition relating to the channel width change (t=$t_s$) is given by equation (8).

$$Q = Q_{ts} \quad \text{[Numerical expression 8]}$$

From expressions (1) and (7), therefore, we obtain expression (9) for the concentration of the material A.

$$[A] = [A]_0 \exp(-k_A t) \quad \text{[Numerical expression 9]}$$

Here, we obtain expression (10) by substituting expression (7) into expression (2) and using relational expression (6).

$$Q = [A]_0 \left(\frac{k_A U_B}{k_{Q1} - k_A}\right) \left\{\begin{array}{c} \exp(-k_A t) - \\ \exp(-k_{Q1} t) \end{array}\right\} (0 \leq t \leq t_s) \quad \text{[Numerical expression 10]}$$

In addition, we obtain expression (11) by substituting expression (7) into expression (3) and using relational expression (8).

$$Q = Q_{ts} + \quad \text{[Numerical expression 11]}$$
$$[A]_0 \left(\frac{k_A U_B}{k_{Q2} - k_A}\right) \left\{\begin{array}{c} \exp(-k_A t) - \\ \exp(-k_{Q2} t) \end{array}\right\} (t_s \leq t \leq t_R)$$

Next, models of the reactor as changed in the S-V ratio of the channel will be described using FIGS. 8A and 8B.

FIG. 8A shows a model of a flat-shaped microreactor having a rectangular channel. In this model, the length, volume, and width of the channel at the upstream side thereof are defined as $L_1$, $V_1$, and $d_1$, respectively, and the length, volume, and width of the channel at the downstream side thereof are defined as $L_2$, $V_2$, and $d_2$, respectively. Channel depth is the same at both sides and is defined as "w". Channel widths $d_1$ and $d_2$ (and channel lengths $L_1$ and $L_2$) are changed under fixed conditions of pressure drop P and in-channel overall volume V ($V=V_1+V_2$).

FIG. 8B shows a model of a tubular microreactor having a columnar channel. In this model, the length, volume, and depth of the channel at the upstream side thereof are defined as $L_1$, $V_1$, and $d_1$, respectively, and the length, volume, and depth of the channel at the downstream side thereof are defined as $L_2$, $V_2$, and $d_2$, respectively. Channel depths $d_1$ and $d_2$ (and channel lengths $L_1$, $L_2$) are changed under fixed conditions of pressure drop P and in-channel overall volume V ($V=V_1+V_2$).

Figure 9A:
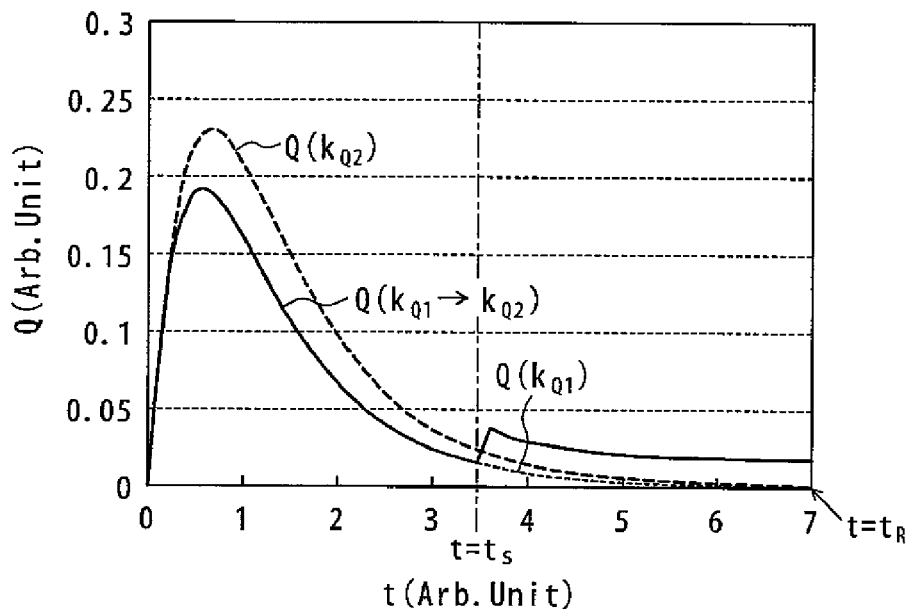
FIGS. 9A and 9B are explanatory diagrams of analytical results in the reactor of the microreactor according to the first embodiment of the present invention.
Figure 9B:
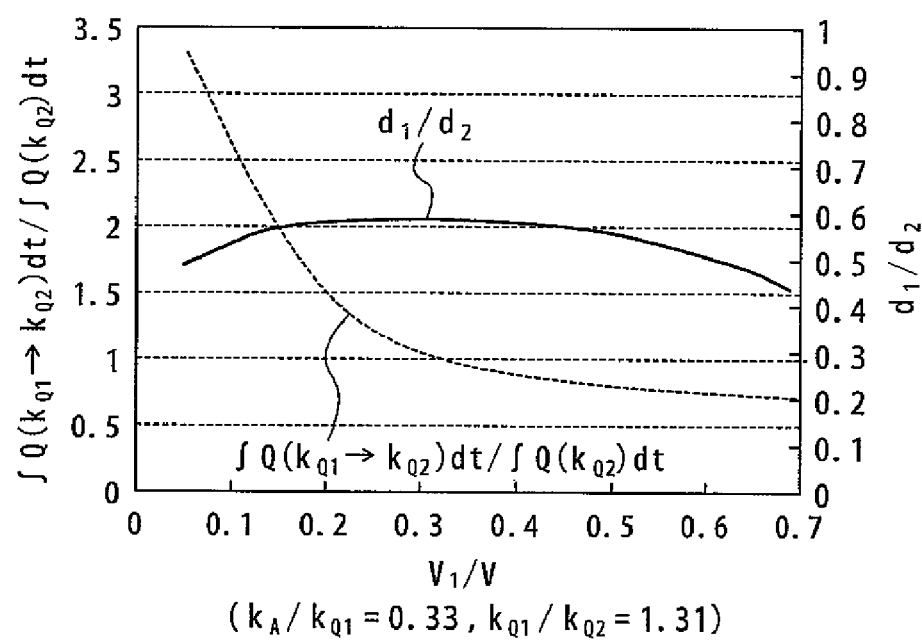

FIGS. 9A and 9B show the analytical results obtained using the flat-plate shaped microreactor (rectangular channel) model. These analyses assume that the heat removal rate is proportional to the S-V ratio of the channel and that there is no heat distribution in a direction perpendicular to the channel length.

FIG. 9A shows an example of heat-time curves. The curve Q ($k_{Q1}$) shown as a dotted line, applies when the heat removal rate constant $k_{Q1}$ remains constant even after the time $t=t_s$, the curve Q ($k_{Q2}$) denoted as a broken line, applies when the heat removal rate constant $k_{Q2}$ remains constant even before $t=t_s$, and the curve Q ($k_{Q1}$->$k_{Q2}$) denoted as a solid line, applies when, at $t=t_s$, the channel width changes from $d_1$ to $d_2$ and the heat removal rate constant changes from $k_{Q1}$ to $k_{Q2}$. Up until the time $t=t_s$, the curve Q ($k_{Q1}$) takes substantially the same shape as that of the curve Q ($k_{Q1}$->$k_{Q2}$).

FIG. 9B shows an example of volume ratio dependence of the amount of heat. More specifically, the dependence of a ratio $\int Q$ ($k_{Q1}$->$k_{Q2}$)dt/$\int Q$ ($k_{Q2}$)dt between time-integrated curves Q ($k_{Q1}$->$k_{Q2}$) and Q ($k_{Q2}$) of the heat-time curves in FIG. 9A, upon the volume ratio $V_1/V$, is represented in the figure. The dependence of $d_1/d_2$ upon the in-channel volume ratio $V_1/V$ is also represented together. FIG. 8B indicates that when $\int Q$ ($k_{Q1}$->$k_{Q2}$)dt/$\int Q$ ($k_{Q2}$)dt is 1 or less, heat removal performance increases if the heat removal rate constant at the upstream side is $k_{Q1}$. FIG. 9B, therefore, indicates that when $V_1/V \geq 0.31$, changing the S-V ratio of the channel yields the effect that the heat can be removed efficiently. In FIG. 9A, $t=t_R$ is a reaction time assuming a 99.9% response of the raw material A.

Figure 10A:
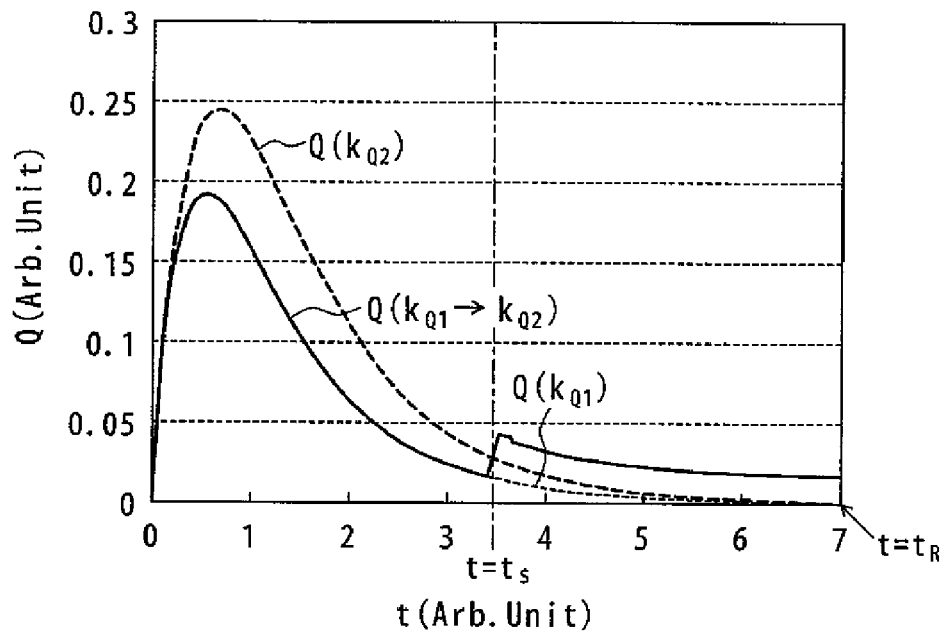
FIGS. 10A and 10B are other explanatory diagrams of analytical results in the reactor of the microreactor according to the first embodiment of the present invention.
Figure 10B:
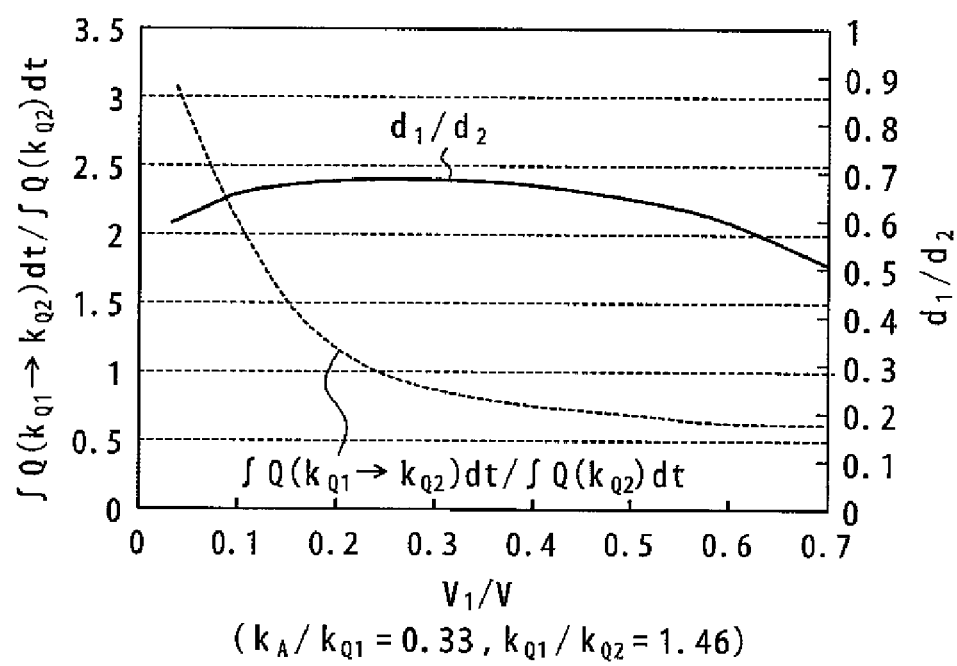
Figure 11A:
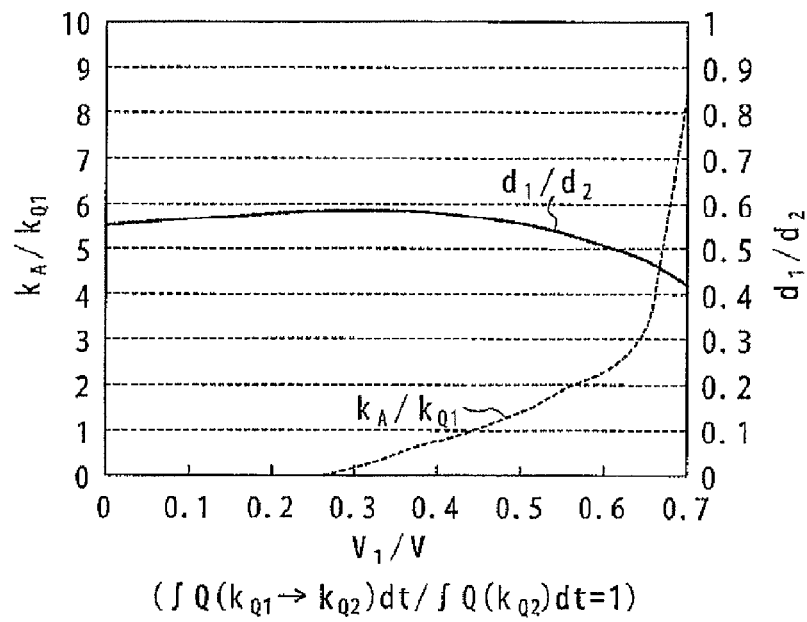
FIGS. 11A and 11B are explanatory diagrams of analytical results on volume ratio dependence of $k_A/k_Q1$ in the reactor of the microreactor according to the first embodiment of the present invention.
Figure 11B:
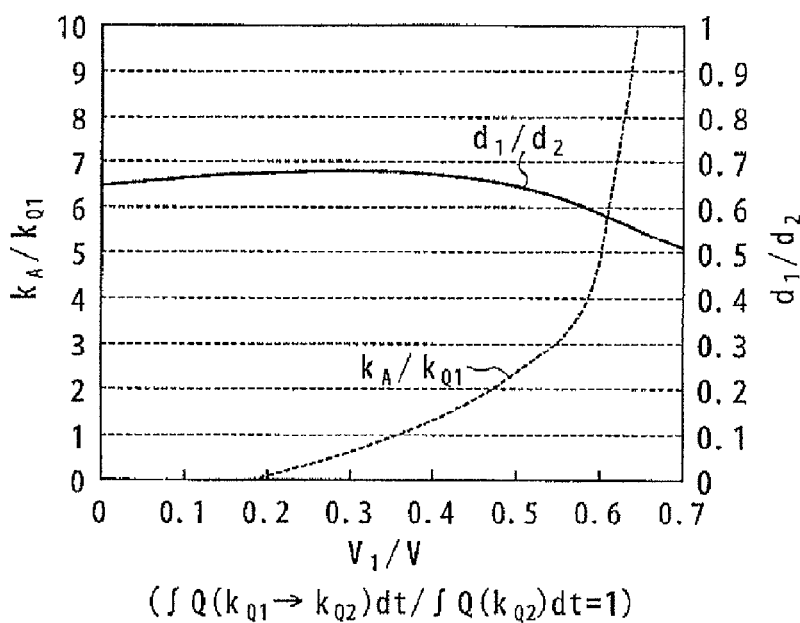

FIGS. 10A and 10B show analytical results obtained using the tubular microreactor (columnar channel) model shown in FIG. 8B. These analyses assume that the heat removal rate is proportional to the surface area of the channel and that there is no heat distribution in the direction perpendicular to the channel length.

FIG. 10A shows an example of heat-time curves. The curve Q ($k_{Q1}$) applies when the heat removal rate constant $k_{Q1}$ remains constant even after the time $t=t_s$, the curve Q ($k_{Q2}$) applies when the heat removal rate constant $k_{Q2}$ remains constant even before $t=t_s$, and the curve Q ($k_{Q1}$->$k_{Q2}$) applies when, at $t=t_s$, the channel width changes from $d_1$ to $d_2$ and the heat removal rate constant changes from $k_{Q1}$ to $k_{Q2}$.

FIG. 10B shows an example of volume ratio dependence of the amount of heat. More specifically, the dependence of a ratio $\int Q$ ($k_{Q1}$->$k_{Q2}$)dt/$\int Q$ ($k_{Q2}$)dt between time-integrated curves Q ($k_{Q1}$->$k_{Q2}$) and Q ($k_{Q2}$) of the heat-time curves in FIG. 10A, upon the volume ratio $V_1/V$, is represented in the figure. The dependence of $d_1/d_2$ upon the in-channel volume ratio $V_1/V$ is also represented together. FIG. 10B indicates that when $\int Q$ ($k_{Q1}$->$k_{Q2}$)dt/$\int Q$ ($k_{Q2}$)dt is 1 or less, heat removal performance increases if the heat removal rate constant at the upstream side is $k_{Q1}$. FIG. 10B, therefore, indicates that when $V_1/V \geq 0.24$, changing the S-V ratio of the channel yields the effect that the heat can be removed efficiently. In FIG. 10A, $t=t_R$ is a reaction time assuming the 99.9% response of the raw material A.

FIGS. 11A and 11B show analytical results on the volume ratio dependence of $k_A/k_{Q1}$ in the microreactor models of FIGS. 8A and 8B. More specifically, these analyses represent the dependence of $k_A/k_{Q1}$, obtained when $\int Q$ ($k_{Q1}$->$k_{Q2}$)dt/$\int Q$ ($k_{Q2}$)dt=1, upon the in-channel volume ratio $V_1/V$. The dependence of $d_1/d_2$ upon the in-channel volume ratio $V_1/V$ is also represented together.

FIG. 11A is for the flat-plate shaped microreactor (rectangular channel) model in FIG. 8A, and indicates that when $V_1/V \geq 0.25$, changing the S-V ratio of the channel yields the effect that the heat can be removed efficiently. Since $V_1/V=0.65$ is an inflection point, when a practical range is considered, the effect of efficient heat removal can be obtained by changing the S-V ratio of the channel in a range of $0.25 \leq V_1/V \leq 0.65$.

FIG. 11B is for the tubular microreactor (columnar channel) model in FIG. 8B, and indicates that when $V_1/V \geq 0.20$, changing the S-V ratio of the channel yields the effect that the heat can be removed efficiently. Since $V_1/V=0.60$ is an inflection point, when a practical range is considered, the effect of efficient heat removal can be obtained by changing the S-V ratio of the channel in a range of $0.20 \leq V_1/V \leq 0.60$.

For these reasons, the amount of heat in the entire system can be suppressed while at the same time reducing the pressure drop P of the entire system, by changing the S-V ratio of the channel at both the upstream and downstream sides thereof using the appropriate $d_1/d_2$ value in the in-channel volume ratio range of $0.20 \leq V_1/V \leq 0.65$ ($V_1:V_2=1:0.53$ to 1:4), and more particularly, in the range of $0.25 \leq V_1/V \leq 0.60$ ($V_1:V_2=1:0.67$ to 1:3).

In addition, although the present embodiment assumes that reactions from the raw material A are exothermic reactions in which the heat of reaction is positive, the reactions may be endothermic reactions in which the heat of reaction is negative. For endothermic reactions, it is obvious that the same discussions as the above will hold when a heat addition rate constant is assigned as both $k_{Q1}$ ($0 \leq t \leq t_s$) in expressions (2) and (4) and $k_{Q2}$ ($t_s \leq t \leq t_R$) in expressions (3) and (5).

As described above, according to the present embodiment, the pressure drop in the entire system can be reduced since the S-V ratio of the reaction channel changes at least once during the flow of the mixture through the channel and since the S-V ratio thereof is increased at the upstream side.

In addition, the reactor can be constructed into a simplified configuration by using two kinds of flat plates of different S-V ratios of the channels and stacking the two kinds of plates in the same number of layers each.

Furthermore, temperature controllability can be assigned to the microreactor by providing a flat plate formed with a heat control channel. Even when the heat of reaction occurs with progress of the reaction, since temperature controllability commensurate with the heat of reaction is maintained, the progress of the reaction can be accelerated in a stable temperature field. Moreover, generation of by-products and runaway of the reaction, associated with changes in temperature, can be suppressed.

Next, a configuration of a microreactor according to a second embodiment of the present invention is described below using FIGS. 12A and 12B to 16A and 16B. An overall configuration of the microreactor according to the present embodiment is substantially the same as in FIG. 1. Also, a configuration of a mixer 103 used in the microreactor according to the present embodiment is substantially the same as in FIG. 2.

Figure 12A:
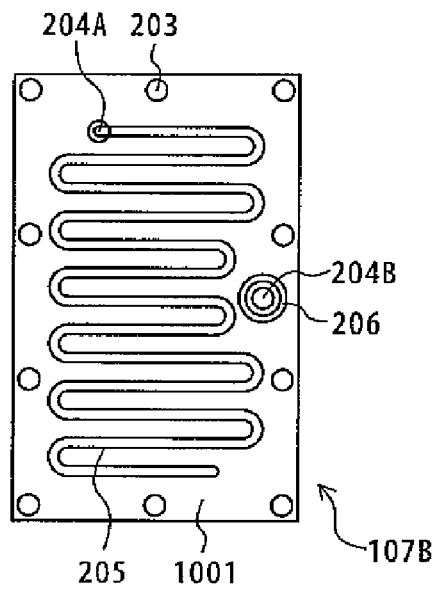
FIGS. 12A and 12B are a plan view and bottom view showing a plate configuration used in a first reactor unit of a microreactor according to a second embodiment of the present invention.
Figure 12B:
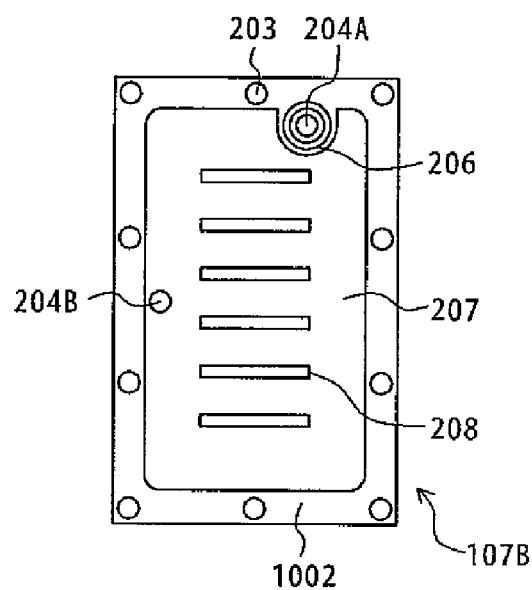
Figure 13A:
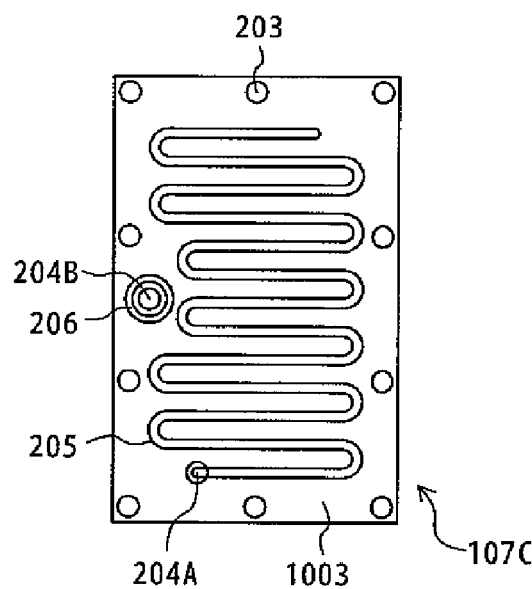
FIGS. 13A and 13B are a plan view and bottom view showing another plate configuration used in the first reactor unit of the microreactor according to the second embodiment of the present invention.
Figure 13B:
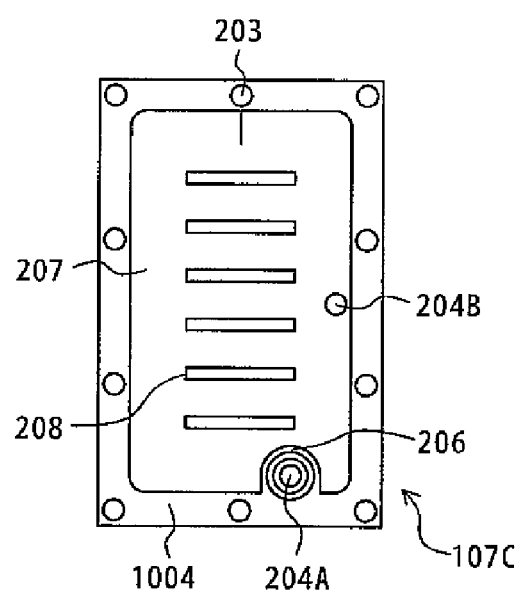
Figure 14A:
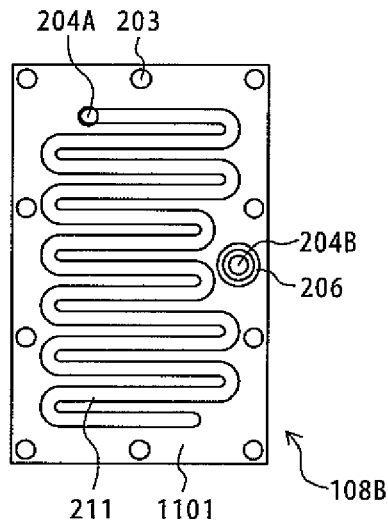
FIGS. 14A and 14B are a plan view and bottom view showing a plate configuration used in a second reactor unit of the microreactor according to the second embodiment of the present invention.
Figure 14B:
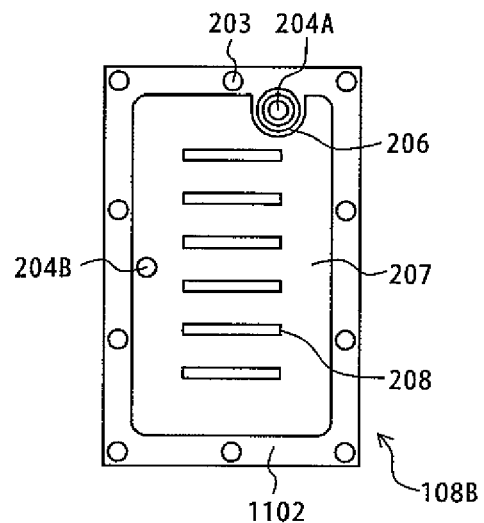
Figure 15A:
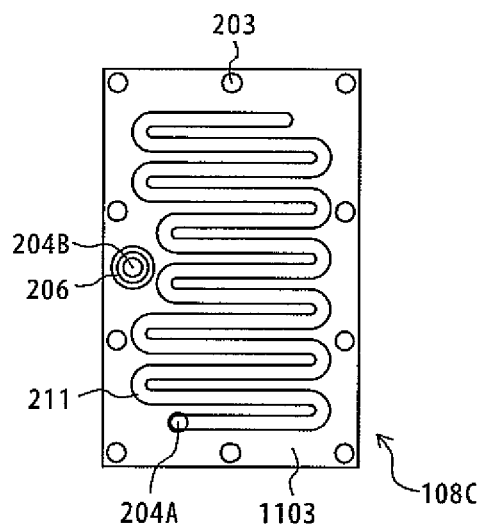
FIGS. 15A and 15B are a plan view and bottom view showing another plate configuration used in the second reactor unit of the microreactor according to the second embodiment of the present invention.
Figure 15B:
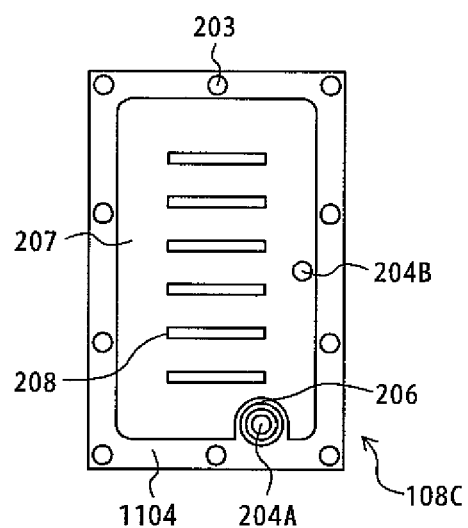
Figure 16A:
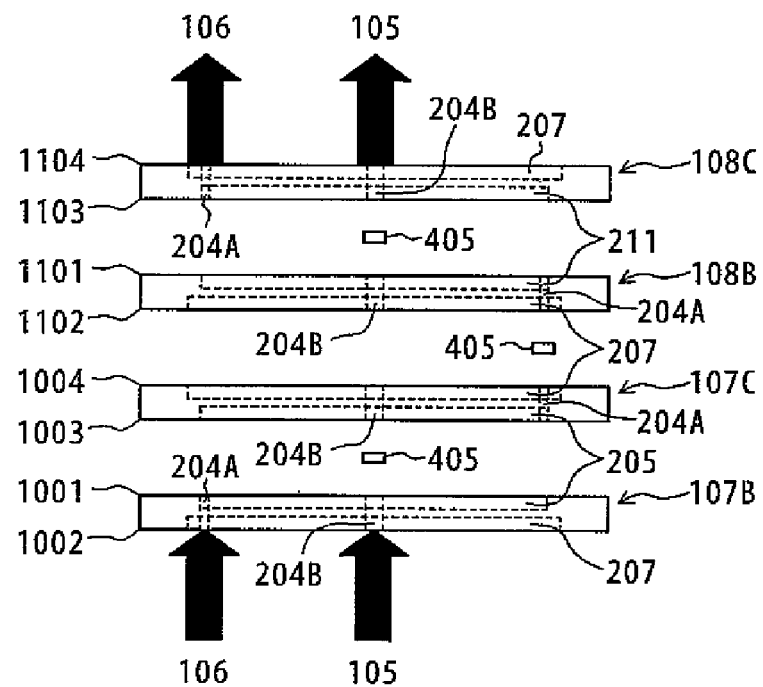
FIG. 16A is an exploded front view of a reactor used in the microreactor according to the second embodiment of the present invention.
Figure 16B:
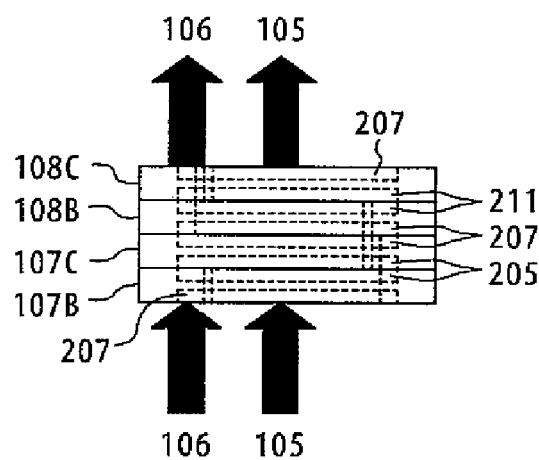
FIG. 16B is a front view of the reactor.

FIGS. 12A and 12B are a plan view and bottom view showing a plate configuration used in a first reactor unit of the microreactor according to the second embodiment of the present invention. FIGS. 13A and 13B are a plan view and bottom view showing another plate configuration used in the first reactor unit of the microreactor according to the second embodiment of the present invention. FIGS. 14A and 14B are a plan view and bottom view showing a plate configuration used in a second reactor unit of the microreactor according to the second embodiment of the present invention. FIGS. 15A and 15B are a plan view and bottom view showing another plate configuration used in the second reactor unit of the microreactor according to the second embodiment of the present invention. FIG. 16A is an exploded front view of the reactor used in the microreactor according to the second embodiment of the present invention. FIG. 16B is a front view of the reactor.

In the present embodiment, both a reactor with a large surface-to-volume (S-V) ratio of the reaction-channel, and a reactor with a small S-V ratio of the reaction-channel are constructed by stacking two kinds of flat plates.

First, the plate configurations in the first reactor unit 107 of the reactor are described below using FIGS. 12A, 12B, 13A, and 13B.

Referring to the plate 107B of FIG. 12A and the plate 107C of FIG. 13A, a large in S-V ratio of the reaction-channel is formed on one face and a reaction channel for heat control is formed on the other face.

As shown in FIG. 12A, threaded holes 203 each for screwing down the plate 107B in stacked form, a groove 206 for an O-ring used for preventing leakage from the plate, a channel 205 of a large S-V ratio, and the through-hole 204A for causing a fluid within the channel 205 of the plate 107B to flow through to next plate are formed on the surface 1001 of the plate 107B.

Also, as shown in FIG. 12B, threaded holes 203 each for screwing down the plate 107B in stacked form, a groove 206 for an O-ring used for preventing leakage from the plate, a channel 207 for a heat carrier, the through-hole 204B for causing a fluid within the channel 207 of the plate 107B to flow through to the next plate, and guides 208 each for ensuring the flow of the heat carrier are formed on the reverse 1002 of the plate 107B.

In addition, as shown in FIG. 13A, threaded holes 203 each for screwing down the plate 107C in stacked form, a groove 206 for an O-ring used for preventing leakage from the plate, a channel 205 of a large S-V ratio, and the through-hole 204A for causing a fluid within the channel 205 of the plate 107C to flow through to next plate are formed on the surface 1003 of the plate 107C. Furthermore, as shown in FIG. 13B, threaded holes 203 each for screwing down the plate 107C in stacked form, a groove 206 for an O-ring used for preventing leakage from the plate, a channel 207 for a heat carrier, the through-hole 204B for causing a fluid within the channel 207 of the plate 107C to flow through to the next plate, and guides 208 each for ensuring the flow of the heat carrier are formed on the reverse 1004 of the plate 107C.

A channel structure obtained by rotating the surface 1001 of the plate 107B through 180 degrees overlaps a channel structure of the surface 1003 of the plate 107C, and a channel structure obtained by rotating the reverse 1002 of the plate 107B through 180 degrees overlaps a channel structure of the reverse 1004 of the plate 107C. Also, the reverse 1002 of the plate 107B and the reverse 1004 of the plate 107C are of the same channel structure. In this case, a channel structure obtained by rotating one plate through 180 degrees overlaps an original channel structure of the particular plate, and at the same time, overlaps the channel structure of the other plate.

Referring next to the plate 108B of FIG. 14A and the plate 108C of FIG. 15A, a reaction channel of a small S-V ratio is formed on one face and a reaction channel for heat control is formed on the other face.

As shown in FIG. 14A, threaded holes 203 each for screwing down the plate 108B in stacked form, a groove 206 for an O-ring used for preventing leakage from the plate, a channel 211 of a small S-V ratio, and the through-hole 204A for causing a fluid within the channel 211 of the plate 108B to flow through to next plate are formed on the surface 1101 of the plate 108B. In addition, as shown in FIG. 14B, threaded holes 203 each for screwing down the plate 108B in stacked form, a groove 206 for an O-ring used for preventing leakage from the plate, a channel 207 for a heat carrier, the through-hole 204B for causing a fluid within the channel 207 of the plate 108B to flow through to the next plate, and guides 208 for ensuring the flow of the heat carrier are formed on the reverse 1102 of the plate 108B.

Further, as shown in FIG. 15A, threaded holes 203 each for screwing down the plate 108C in stacked form, a groove 206 for an O-ring used for preventing leakage from the plate, a channel 211 of a small S-V ratio, and the through-hole 204A for causing a fluid within the channel 211 of the plate 108C to flow through to the next plate are formed on the surface 1103 of the plate 108C. Moreover, as shown in FIG. 15B, threaded holes 203 each for screwing down the plate 108C in stacked form, a groove 206 for an O-ring used for preventing leakage from the plate, a channel 207 for a heat carrier, the through-hole 204B for causing a fluid within the channel 207 of the plate 108C to flow through to the next plate, and guides 208 for ensuring the flow of the heat carrier are formed on the reverse 1104 of the plate 108C.

A channel structure obtained by rotating the surface 1101 of the plate 108B through 180 degrees overlaps a channel structure of the surface 1103 of the plate 108C, and a channel structure obtained by rotating the reverse 1102 of the plate 108B through 180 degrees overlaps a channel structure of the reverse 1104 of the plate 108C. Also, the reverse 1102 of the plate 108B and the reverse 1104 of the plate 108C are of the same channel structure. In this case, a channel structure obtained by rotating one plate through 180 degrees overlaps an original channel structure of the particular plate, and at the same time, overlaps the channel structure of the other plate.

Additionally, the reverse 1102 of the plate 108B and the reverse 1002 of the plate 107B are of the same channel structure, and the reverse 1104 of the plate 108C and the reverse 1004 of the plate 107C are of the same channel structure. The channel structure obtained by rotating the reverse 1102 of the plate 108B through 180 degrees overlaps the channel structures of the reverse 1004 of the plate 107C and the reverse 1104 of the plate 108C, and the channel structure obtained by rotating the reverse 1104 of the plate 108C through 180 degrees overlaps the channel structures of the reverse 1002 of the plate 107B and the reverse 1102 of the plate 108B.

FIG. 16A shows an assembly state of the reactor 109. Four kinds of flat plates, that is, the plates 107B, 107C, 108B, and 108C, are each stacked in single-layer form to construct the microreactor.

As described above, the channel structure obtained by rotating the surface 1001 of the plate 107B through 180 degrees overlaps the channel structure of the surface 1003 of the plate 107C, and the channel structure obtained by rotating the surface 1101 of the plate 108B through 180 degrees overlaps the channel structure of the surface 1103 of the plate 108C. Therefore, the formation of the channel in addition to complete matching in shape between the channels on each face can be achieved by matching the surfaces of the plates 107B and 107C or of the plates 108B and 108C in such a form as to make the through-holes 204A and 204B communicate with each other.

In addition, as described above, the channel structure obtained by rotating the reverse 1002 of the plate 107B through 180 degrees overlaps the channel structure of the reverse 1102 of the plate 108B, and the channel structure obtained by rotating the reverse 1004 of the plate 107C through 180 degrees overlaps the channel structure of the reverse 1104 of the plate 108C. Therefore, the formation of the channel in addition to complete matching in shape between the channels on each face can be achieved by matching the reverses of the plates of the same kind (i.e., 107B, 107C, 108B, and 108C) or the reverse of one of these plates and the reverse of another plate in such a form as to make the through-holes 204A and 204B communicate with each other.

As shown in FIG. 16A, the reverse 1002 of the plate 107B, the surface 1001 thereof, the surface 1003 of the plate 107C, the reverse 1004 thereof, the reverse 1102 of the plate 108B, the surface 1101 thereof, the surface 1103 of the plate 108C, and the reverse 1104 thereof can be arranged in that order from the upstream side, towards the downstream side, by establishing the communication between the through-holes 204A and 204B in the above-described way. It can be seen, therefore, that the mixture 106 and heat carrier 105 introduced from the upstream side make the plates 107B and 107C, and the plates 108B and 108C communicate through the through-holes 204A and 204B.

As shown in FIG. 16B, it can also be seen that under the assembled state of the reactor 109, the mixture 106 and heat carrier 105 introduced from the upstream side make the plates 107B and 107C, and the plates 108B and 108C communicate through the through-holes 204A and 204B.

The channel structures on the reverses of the plates 107B, 107C, 108B, and 108C need only to satisfy such a positional relationship that even the through-holes 204A and 204B match each other to ensure the flow of the heat carrier. In addition, the threaded holes 203, screws for screwing down the plates in stacked form, and the groove 206 for an O-ring 405 are not shown in FIGS. 16A and 16B.

As described above, according to the present embodiment, pressure drop in an entire system can be reduced since the S-V ratio of the reaction-channel changes at least once during the flow of the mixture through the channel and since the S-V ratio thereof is increased at the upstream side.

In addition, the reactor can be constructed into a simplified configuration by using two kinds of flat plates of different S-V ratio of the channels and stacking the two kinds of plates in the same number of layers each.

Furthermore, temperature controllability can be assigned to the microreactor by providing a flat plate formed with a heat control channel.

Next, a configuration of a microreactor according to a third embodiment of the present invention is described below using FIGS. 17A, 17B, 17C, 18A, and 18B. An overall configuration of the microreactor according to the present embodiment is substantially the same as in FIG. 1. Also, a configuration of a mixer 103 used in the microreactor according to the present embodiment is substantially the same as in FIG. 2.

Figure 17A:
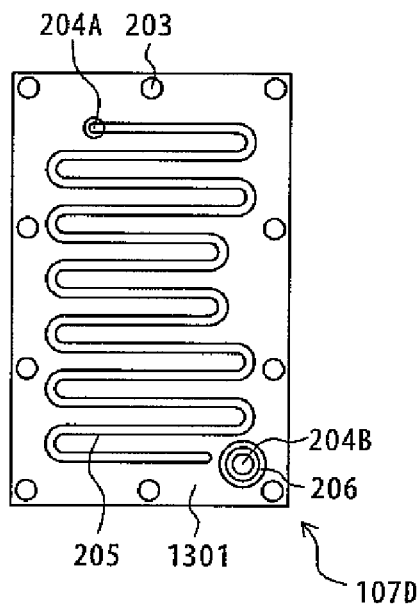
FIGS. 17A, 17B, and 17C are plan views showing a plate configuration used in a microreactor according to a third embodiment of the present invention.
Figure 17B:
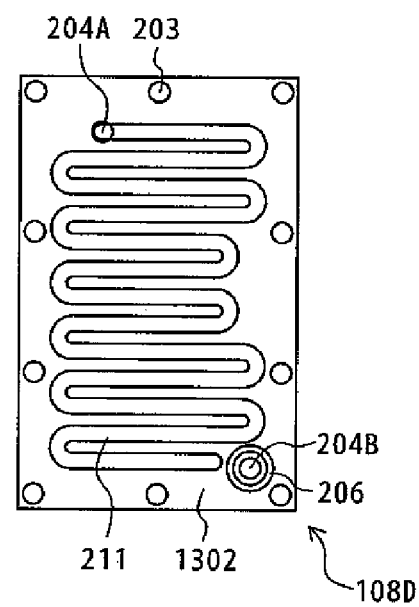
Figure 17C:
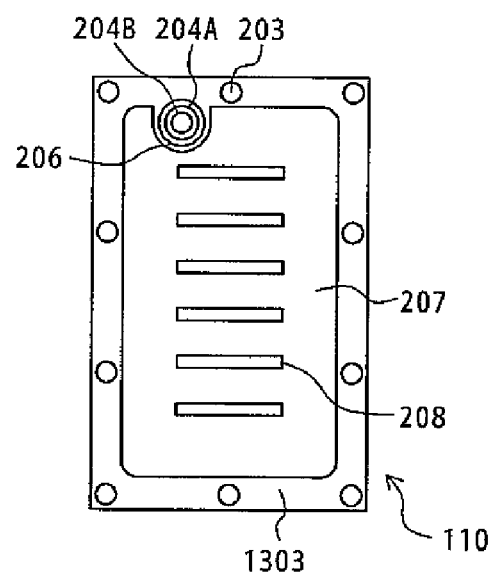
Figure 18A:
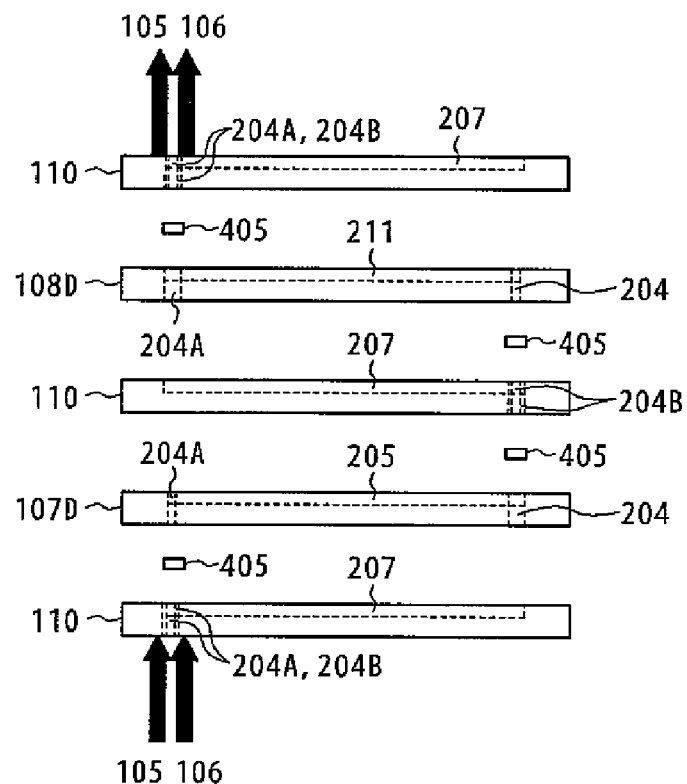
FIG. 18A is an exploded front view of a reactor used in the microreactor according to the third embodiment of the present invention.
Figure 18B:
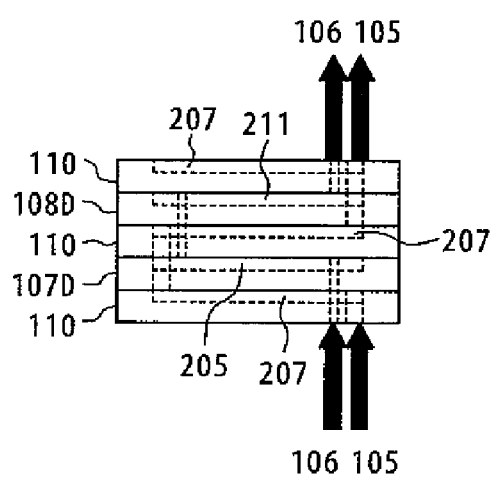
FIG. 18B is a front view of the reactor.

FIGS. 17A, 17B, and 17C are plan views showing a plate configuration used in the microreactor according to the third embodiment of the present invention. FIG. 18A is an exploded front view of a reactor used in the microreactor according to the third embodiment of the present invention. FIG. 18B is a front view of the reactor.

The present embodiment uses a reactor flat plate 107D having a large surface-to-volume (S-V) ratio of the reaction-channel, a reactor flat plate 108D having a small S-V ratio of the reaction-channel, and a flat plate 110 with a channel formed thereon for heat control. On the plates 107D, 108D, and 110, one face only is channeled and the other face has a flat plate shape.

First, the plate configurations in the reactor are described below using FIGS. 17A, 17B, and 17C.

FIG. 17A shows the flat plate 107D having a large S-V ratio of the reaction-channel. Threaded holes 203 each for screwing down the plate 107D in stacked form, a groove 206 for an O-ring used for preventing leakage from the plate, a channel 205 of a large S-V ratio, and the through-hole 204A for causing a fluid within the channel 205 of the plate 107D to flow through to next plate are formed on the surface 1301 of the plate 107D. The reverse of the plate 107D includes the through-holes 204A and 204B, but does not include a channel or the like.

FIG. 17B shows the flat plate 108D having a small S-V ratio of the reaction-channel. Threaded holes 203 each for screwing down the plate 108D in stacked form, a groove 206 for an O-ring used for preventing leakage from the plate, a channel 211 of a small S-V ratio, and the through-hole 204A for causing a fluid within the channel 211 of the plate 108D to flow through to next plate are formed on the surface 1302 of the plate 108D. The reverse of the plate 108D includes the through-holes 204A and 204B, but does not include a channel or the like.

FIG. 17C shows the heat control plate 110. Threaded holes 203 each for screwing down the plate 110 in stacked form, a groove 206 for an O-ring used for preventing leakage from the plate, a channel 207 for the heat carrier, the through-hole 204B for causing a fluid within the channel 207 of the heat control plate 110 to flow through to next plate, and guides 208 for ensuring the flow of the heat carrier are formed on the surface 1303 of the heat control plate 110. The reverse of the heat control plate 110 includes the through-holes 204A and 204B, but does not include a channel or the like.

FIGS. 18A and 18B show the reactor 109 constructed by stacking the two kinds of flat plates 107D and 108D of FIGS. 17A, 17B, and 17C, in single-layer form each and interposing the heat control plate 110 between the two kinds of flat plates.

As shown in FIG. 18A, when the plate 107D and the heat control plate 110 or the plate 108D and the heat control plate 110 are matched to make the through-holes 204A and 204B communicate with each other, the channels formed on the surface of one plate are lidded by the reverse of the other adjacent plate. The two plates thus communicate with each other.

As shown in FIG. 18A, one heat control plate 110, the plate 107D, another heat control plate 110, the plate 108D, and yet another heat control plate 110 can be arranged in that order from the upstream side, towards the downstream side, by establishing the communication between the through-holes 204A and 204B in the above-described way. The mixture 106 and heat carrier 105 introduced from the upstream side, therefore, can make the plates 107D, 108D, and the heat control plates 110 communicate through the through-holes 204A and 204B.

In addition, as shown in FIG. 18B, the mixture 106 and heat carrier 105 introduced from the upstream side can make the plates 107D, 108D, and the heat control plates 110 communicate through the through-holes 204A and 204B.

Furthermore, the threaded holes 203, screws for screwing down the plates in stacked form, and the groove 206 for an O-ring 405 are not shown in FIGS. 18A and 18B.

As described above, according to the present embodiment, pressure drop in an entire system can be reduced since the S-V ratio of the reaction channel changes at least once during the flow of the mixture through the channel and since the S-V ratio thereof is increased at the upstream side.

In addition, the reactor can be constructed into a simplified configuration by using two kinds of flat plates of different S-V ratios of the channels and stacking the two kinds of plates in the same number of layers each.

Furthermore, temperature controllability can be assigned to the microreactor by providing a flat plate formed with a heat control channel.

Moreover, although the number of plates is increased by one in comparison with the example of the first or second embodiment, workability improves since channels are formed on one face only.

Next, a configuration of a microreactor according to a fourth embodiment of the present invention will be described using FIGS. 19 and 20.

Figure 19:
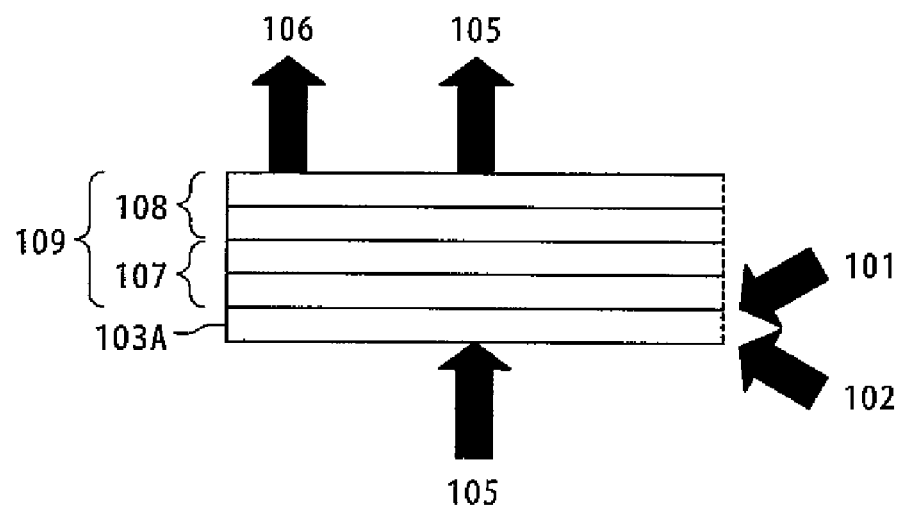
FIG. 19 is a front plan view showing an overall configuration of a microreactor according to a fourth embodiment of the present invention.

FIG. 19 is a front plan view showing an overall configuration of the microreactor according to the fourth embodiment of the present invention. FIG. 20 is a perspective view showing a configuration of a mixer used in the microreactor according to the fourth embodiment of the present invention.

The microreactor of the present embodiment includes a mixer 103A having a mixing channel, and a reactor 109 having a reaction channel. The present embodiment is characterized in that the reactor 109 is stacked upon and constructed integrally with the mixer 103A.

A first raw material 101 and a second raw material 102 are introduced into the mixer 103A, and then the two kinds of materials are mixed in the mixing channel located inside the reactor 103A. The materials that have been mixed in the mixer 103A are further introduced into the reactor 109. Inside the reactor 109, the two kinds of mixed materials chemically react upon each other to form a product 106. Also, a heat carrier 105 for controlling temperature so that the chemical reactions in the reactor 109 take place at a desired temperature is introduced into the reactor 109. A heat carrier channel for the heat carrier 105 to flow through is formed in the reactor 109. A structure of the mixing channel in the mixer 103A will be described later herein using FIG. 20. Structures of the reaction channel and heat carrier channel in the reactor 109 are substantially the same as the channel structures shown in FIGS. 3 to 6, 12 to 16, or 17 and 18.

Next, a configuration of the mixer 103A used in the microreactor according to the present embodiment is described below using FIG. 20.

Figure 20:
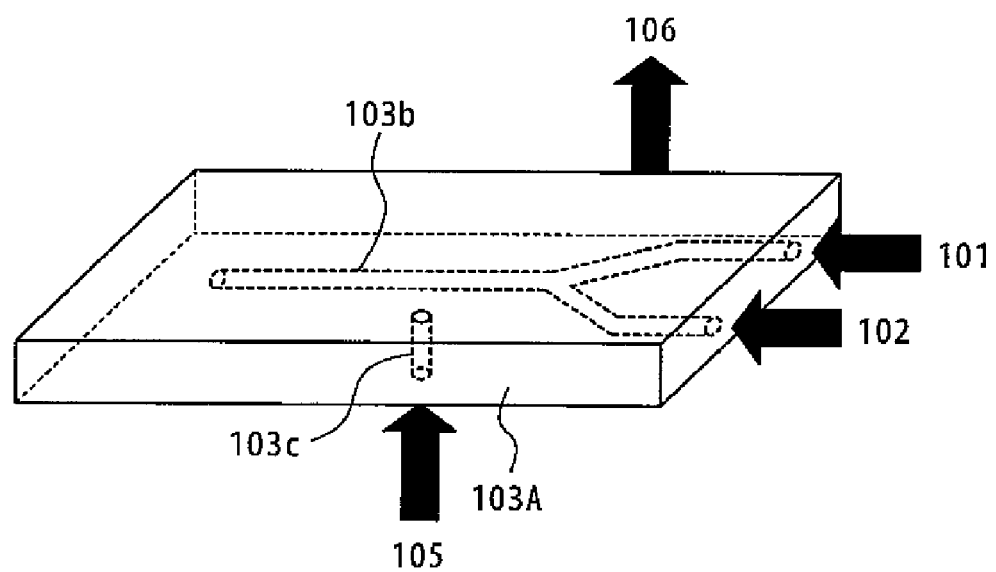
FIG. 20 is a perspective view showing a configuration of a mixer used in the microreactor according to the fourth embodiment of the present invention.

FIG. 20 is a perspective view showing the configuration of the mixer 103A used in the microreactor according to the fourth embodiment of the present invention.

The mixer 103A internally has a Y-shaped mixing channel 103b formed with two inflow ports and one outflow port, as denoted by a dotted line. The first raw material 101 is introduced from a first inflow port into the mixing channel 103b, and the second raw material 102 is introduced from a second inflow port into the mixing channel 103b. The two kinds of raw materials that have flown in from the first inflow port and the second inflow port converge midway in the mixing channel 103b and are mixed therein.

The mixer 103A differs from that of FIG. 2 in that the outflow port of the mixing channel 103b is positioned at an equivalent of a connecting position to the through-hole 204A in the first plate 107A shown as the lowest stage in FIG. 6A. The mixer 103A also has a through-hole 103c for introducing a heat carrier.

As described above, according to the present embodiment, pressure drop in an entire system can also be reduced since the S-V ratio of the reaction channel changes at least once during the flow of the mixture through the channel and since the S-V ratio thereof is increased at the upstream side.

In addition, the reactor can be constructed into a simplified configuration by using two kinds of flat plates of different S-V ratios of the channels and stacking the two kinds of plates in the same number of layers each.

Furthermore, temperature controllability can be assigned to the microreactor by providing a flat plate formed with a heat control channel.

Moreover, the microreactor can be constructed into a compact shape by integrating the mixer with the reactor.

Next, a configuration of a microreactor according to a fifth embodiment of the present invention will be described using FIGS. 21 and 22.

Figure 21:
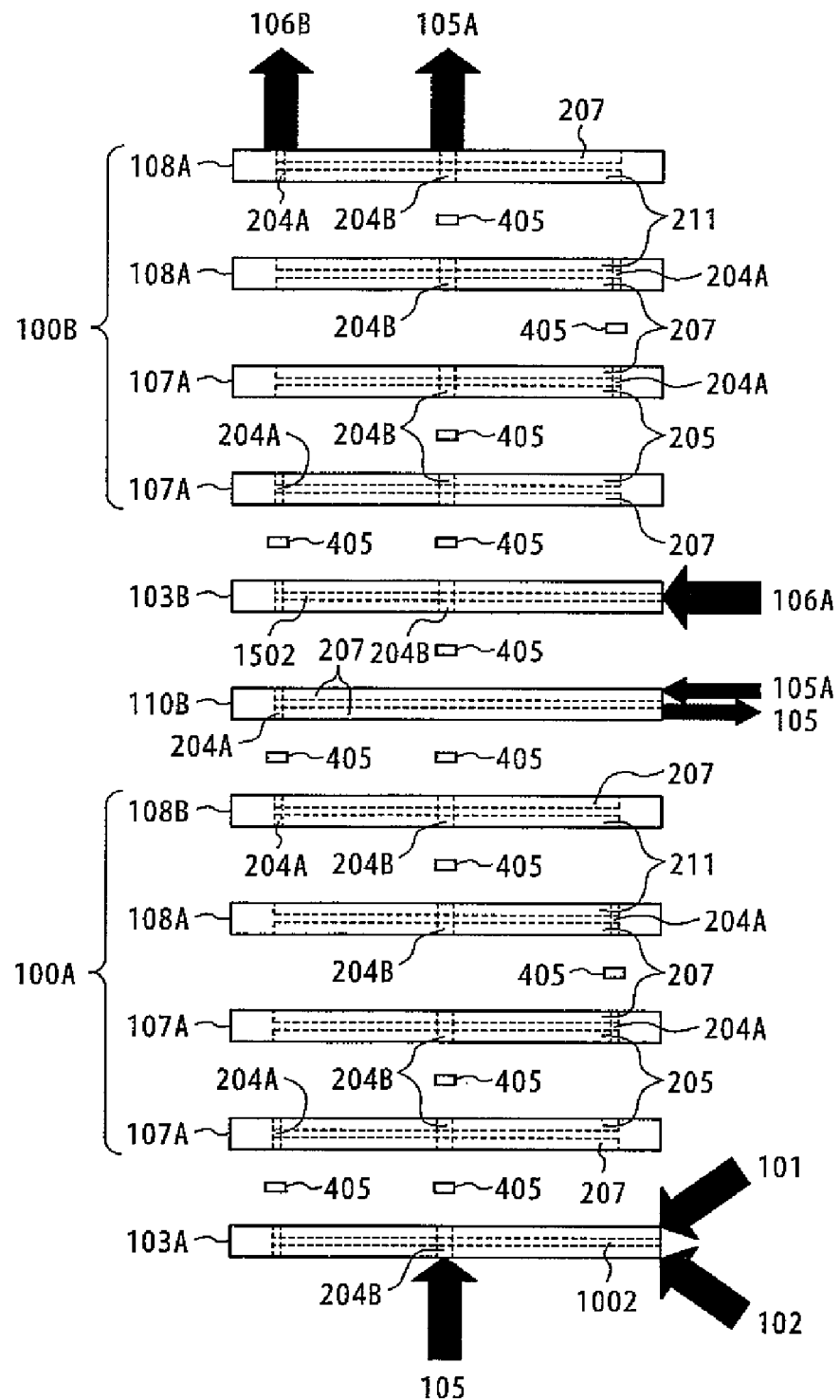
FIG. 21 is an exploded front view showing an overall configuration of a microreactor according to a fifth embodiment of the present invention.
Figure 22:
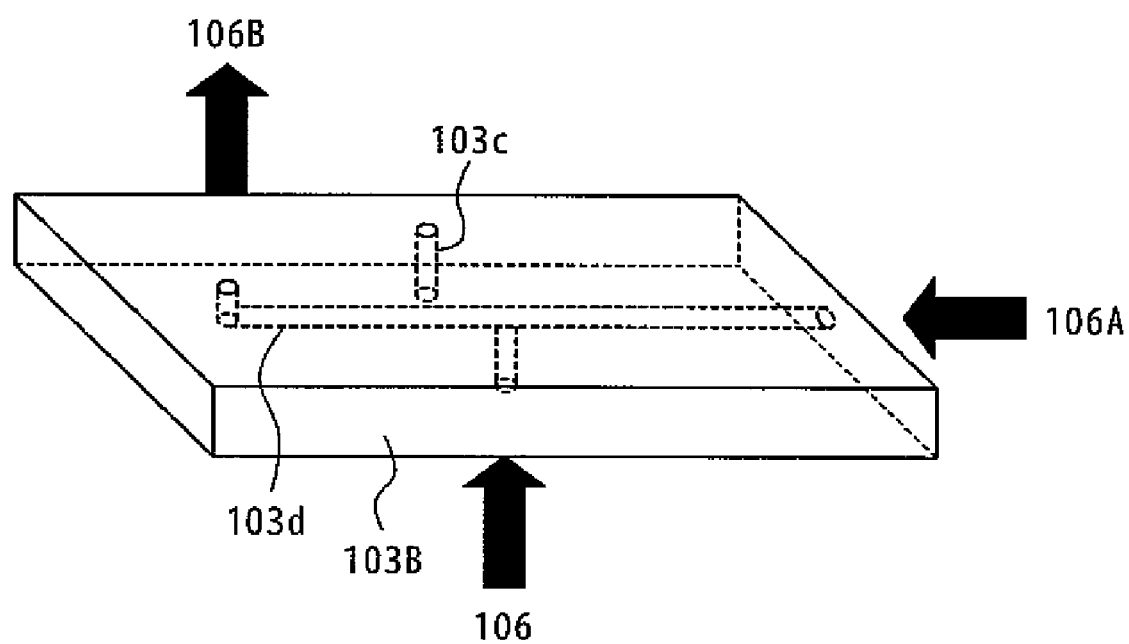
FIG. 22 is a perspective view showing a configuration of a mixer used in the microreactor according to the fifth embodiment of the present invention.

FIG. 21 is an exploded front view showing an overall configuration of the microreactor according to the fifth embodiment of the present invention. FIG. 22 is a perspective view showing a configuration of a mixer used in the microreactor according to the fifth embodiment of the present invention.

In the present embodiment, at a downstream side of a mixer 103A for mixing two kinds of raw materials, a first reactor 100A is connected, a mixer 103B for mixing a third raw material is also connected, and a second reactor 100B is further connected. Additionally, a partitioning heat-carrier plate 110B for supplying a second heat carrier 105A is inserted between the first reactor 100A and the mixer 103B.

The mixer 103A for mixing two kinds of raw materials has substantially the same configuration as that described using FIG. 20. Configurations of the first reactor 100A and the second reactor 100B are substantially the same as the configurations shown in FIGS. 3 to 6.

At the partitioning heat-carrier plate 110B, a first heat carrier 105 that has been flowing upstream with respect to the partitioning heat-carrier plate 110B can be discharged therefrom and the second heat carrier 105A can be introduced therefrom. Inserting the partitioning heat-carrier plate 110B, therefore, allows more precise temperature control, even when the upstream side and downstream side of the partitioning heat-carrier plate 110B are to be controlled to the same temperature. The upstream side and the downstream side can also be controlled to different temperatures by the insertion.

In addition, connecting to the downstream side of the partitioning heat-carrier plate 110B the mixer 103B for mixing two kinds of raw materials makes a new third raw material 106A introducible for addition to the mixture that has flown out from the mixer located at the upstream side. Thus, the microreactor of the present embodiment can also be applied to multi-step reactions or quenching reactions.

The configuration of the mixer 103B used in the microreactor according to the present embodiment is described below using FIG. 22.

The mixer 103B internally has a mixing channel 103d as denoted by a dotted line. A first product 106 is introduced from a first inflow port into the mixing channel 103d, and the third raw material 106A is introduced from a second inflow port into the mixing channel 103d. The two kinds of raw materials that have flown in from the first inflow port and the second inflow port converge midway in the mixing channel 103d and are mixed therein, and the resulting mixture 106A flows out.

As with the through-hole 103C shown in FIG. 20, the mixer 103B has a through-hole 103c for introducing a heat carrier.

The configuration of the microreactor 107 and 108 in the present embodiment can be the configuration shown in any one of FIGS. 12 to 18. Alternatively, an independent configuration can be used for the microreactor 107 and 108.

As described above, according to the present embodiment, pressure drop in an entire system can also be reduced since an S-V ratio of a reaction channel changes at least once during the flow of the mixture through the channel and since the S-V ratio thereof is increased at the upstream side.

In addition, the reactor can be constructed into a simplified configuration by using two kinds of flat plates of different S-V ratios of the channels and stacking the two kinds of plates in the same number of layers each.

Furthermore, temperature controllability can be assigned to the microreactor by providing a flat plate formed with a heat control channel.

Moreover, the microreactor can also be applied to multi-step reactions and quenching reactions.

What is claimed is:

1. A microreactor comprising:
   a mixing channel for mixing at least two kinds of raw materials; and
   a reaction channel connected to a downstream side of the mixing channel to receive the mixture flowing out from the mixing channel and cause chemical reactions of the mixture inside the reaction channel;
   wherein, during the flow of the mixture through the reaction channel, a surface-to-volume (S-V) ratio of the reaction-channel changes only once and the S-V ratio of the reaction channel is larger at an upstream side thereof than at a downstream side thereof.

2. The microreactor according to claim 1, wherein:
   when a position at which the S-V ratio changes is used as a reference position, an internal volume ratio of the reaction channel at the upstream side thereof to an internal volume ratio of the reaction channel at the downstream side thereof stays within a range of 1:0.53 to 1:4.

3. The microreactor according to claim 1,
   wherein the reaction channel is constructed by:
   providing two kinds of flat-shaped plates different from each other in the S-V ratio of the reaction channel; and then
   stacking the two kinds of plates upon each other in the same number of layers;
   wherein the S-V ratio of the reaction channel becomes larger at an upstream side of a reference position than at a downstream side of the reference position.

4. The microreactor according to claim 3, wherein:
   the reaction channel is constructed by contacting faces of the flat-shaped plates on which the reaction channel is formed.

5. The microreactor according to claim 3, wherein:
   a channel for heat control is formed on the backside of the face having the reaction channel formed thereupon.

6. The microreactor according to claim 3, further comprising at least one additional reaction channel connected in series with the reaction channel.

7. The microreactor according to claim 6, further comprising an additional mixing channel connected in series between the additional reaction channel and the reaction channel.

8. The microreactor according to claim 1, further comprising at least one additional reaction channel connected in series with the reaction channel.

9. The microreactor according to claim 8, further comprising an additional mixing channel connected in series between the additional reaction channel and the reaction channel.

10. A microreactor comprising:
    a first mixing channel for mixing at least two kinds of raw materials;
    a first reaction channel connected to a downstream side of the first mixing channel to receive the mixture flowing out from the first mixing channel and cause chemical reactions of the mixture inside the first reaction channel;
    a second mixing channel for mixing other raw materials into a product flowing out from the first reaction channel; and
    a second reaction channel connected to a downstream side of the second mixing channel to receive the mixture flowing out from the second mixing channel and cause chemical reactions of the mixture inside the second reaction channel;
    wherein, during the flow of the mixtures through the first and second reaction channels, surface-to-volume (S-V) ratios of both the first and second reaction channels change only once, and the S-V ratios of the reaction channels are larger at an upstream side thereof than at a downstream side thereof.

* * * * *